US011071056B2

(12) United States Patent
Hu et al.

(10) Patent No.: US 11,071,056 B2
(45) Date of Patent: *Jul. 20, 2021

(54) APPARATUS, METHOD, AND SYSTEM FOR CELL SELECTION

(71) Applicant: HUAWEI TECHNOLOGIES CO., LTD., Guangdong (CN)

(72) Inventors: Zhenxing Hu, Shenzhen (CN); Wei Quan, Beijing (CN); Yongqiang Gao, Beijing (CN); Xiaodong Yang, Shenzhen (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

This patent is subject to a terminal disclaimer.

(21) Appl. No.: 16/544,744

(22) Filed: Aug. 19, 2019

(65) Prior Publication Data

US 2019/0373544 A1 Dec. 5, 2019

Related U.S. Application Data

(63) Continuation of application No. 15/221,858, filed on Jul. 28, 2016, now Pat. No. 10,390,298, which is a (Continued)

(51) Int. Cl.
*H04W 48/20* (2009.01)
*H04B 17/318* (2015.01)
(Continued)

(52) U.S. Cl.
CPC .......... *H04W 48/20* (2013.01); *H04B 17/318* (2015.01); *H04W 88/02* (2013.01); *H04W 88/08* (2013.01)

(58) Field of Classification Search
None
See application file for complete search history.

(56) References Cited

U.S. PATENT DOCUMENTS

2006/0030324 A1* 2/2006 Hsu .................. H04W 36/30
455/437
2006/0258386 A1* 11/2006 Jeong ................ H04W 36/24
455/525
(Continued)

FOREIGN PATENT DOCUMENTS

CN          1956590 A       5/2007
CN        101170834 A       4/2008
(Continued)

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 11 )", 3GPP TS 36.304 v11.6.0, Dec. 2013, 34 pages.
(Continued)

*Primary Examiner* — Jamaal Henson
(74) *Attorney, Agent, or Firm* — Fish & Richardson P.C.

(57) ABSTRACT

The present disclosure relates to apparatus, methods, and systems for cell selection. One example method includes measuring a received signal communication parameter value of a first cell, determining whether the communication parameter value is greater than a first threshold, if the communication parameter value is less than or equal to the first threshold, obtaining a second threshold, determining whether the communication parameter value is greater than the second threshold, and if the communication parameter value is greater than the second threshold, setting the first cell as a serving cell of a terminal device.

20 Claims, 8 Drawing Sheets

Related U.S. Application Data continuation of application No. PCT/CN2014/071803, filed on Jan. 29, 2014.

(51) Int. Cl.
  *H04W 88/02* (2009.01)
  *H04W 88/08* (2009.01)

(56) References Cited

U.S. PATENT DOCUMENTS

| | | | |
|---|---|---|---|
| 2007/0032237 A1* | 2/2007 | Chang | H04B 17/318 455/436 |
| 2008/0167054 A1 | 7/2008 | Shaheen | |
| 2009/0270104 A1 | 10/2009 | Du et al. | |
| 2012/0003943 A1* | 1/2012 | Marinier | H04W 36/0085 455/73 |
| 2012/0218021 A1 | 8/2012 | Komine et al. | |
| 2013/0029666 A1* | 1/2013 | Jung | H04W 36/0085 455/436 |
| 2013/0183974 A1 | 7/2013 | Johansson et al. | |
| 2013/0189996 A1 | 7/2013 | Sridhar et al. | |
| 2013/0267232 A1 | 10/2013 | Alam et al. | |
| 2013/0344872 A1 | 12/2013 | Nukala et al. | |
| 2014/0179320 A1 | 6/2014 | Jang et al. | |
| 2014/0335863 A1* | 11/2014 | Wu | H04W 36/00835 455/436 |
| 2015/0312818 A1* | 10/2015 | Yiu | H04W 36/0094 455/436 |

FOREIGN PATENT DOCUMENTS

| | | |
|---|---|---|
| CN | 101557627 A | 10/2009 |
| CN | 101646197 A | 2/2010 |
| CN | 101651961 A | 2/2010 |
| CN | 102131253 A | 7/2011 |
| WO | WO2012/153995 A2 | 11/2012 |

OTHER PUBLICATIONS

CATT, "Discussion on mobility support for Low Complexity MTC UEs and MTC coverage enhancement", 3GPP TSG RAN WG2 Meeting #84 San Francisco, USA, Nov. 11-15, 2013, R2-134040, 4 pages.

"Leftover Issues of Mobility Enhancement in eMTC", Huawei, HiSilicon, 3GPP TSG-RAN WG2 Meeting #92, Nov. 16-20, 2015, R2-156471, 4 pages.

EPO Communication pursuant to Article 94(3) EPC issued in European Application No. 14880893.4 dated Jun. 26, 2020, 13 pages.

Sony, "Enhanced Coverage Mobility Issues," 3GPP TSG-RAN WG2 Meeting #84, R2-133821, San Francisco, USA, Nov. 11-15, 2013, 4 pages.

Alcatel-Lucent et al., "Mobility issues of low complexity UE with/without enhanced coverage mode," 3GPP TSG-RAN WG RAN3#84, R2-134330, San Francisco, USA, Nov. 7-11 2013, 4 pages.

Huawei et al., "Mobility support for Low Cost MTC and Coverage Enhancement," 3GPP TSG-RAN WG2 #84, R2-133921, San Francisco, US, Nov. 11-15, 2013, 3 pages.

Huawei et al., "SIB in 'enhanced coverage mode,'" 3GPP TSG-RAN WG2 #84, R2-133920, San Francisco, US, Nov. 11-15, 2013, 3 pages.

Office Action issued in Chinese Application No. 201911400636.4 dated Feb. 1, 2021, 15 pages (with English ranslation).

* cited by examiner

APPARATUS, METHOD, AND SYSTEM FOR CELL SELECTION

CROSS-REFERENCE TO RELATED APPLICATIONS

This application is a continuation of U.S. patent application Ser. No. 15/221,858, filed on Jul. 28, 2016, which is a continuation of International Application No. PCT/CN2014/071803, filed on Jan. 29, 2014. All of the afore-mentioned patent applications are hereby incorporated by reference in their entireties.

TECHNICAL FIELD

The present invention relates to the communications field, and in particular, to an apparatus, a method, and a system for cell selection.

BACKGROUND

At present, processes related to mobility of a terminal device include cell selection and cell reselection. In the prior art, when the terminal device is switched on or enters a signal coverage area from a coverage hole, if the terminal device does not store information about a cell on which the terminal device camps before the terminal device is switched on or enters the signal coverage area from the coverage hole, the terminal device first scans all available radio frequency channels, and searches on a carrier of each radio frequency channel for only a cell having best radio frequency channel quality, and then the terminal device measures a communication parameter value of the cell, receives a broadcast message sent by a base station, and determines, according to a criterion S (select), whether the cell found by the terminal device is a suitable cell for the terminal device to camp on. When the communication parameter value obtained by the terminal device through measurement meets the criterion S, the terminal device sets the cell as a serving cell of the terminal device. A communication parameter is received signal strength or received signal quality. It should be noted that, when the terminal device sets the cell as the serving cell of the terminal device, a communication state of the cell is a non-barred state, and a barred state of the cell is a state in which the cell can only provide an emergency call communications service to the terminal device.

After the terminal device camps on the serving cell, if the broadcast message received by the terminal device includes a neighboring cell of the serving cell and a priority of the neighboring cell is higher than a priority of the serving cell, the terminal device measures the neighboring cell. If received signal strength of the neighboring cell is higher than a preset threshold of the neighboring cell in the broadcast message within a cell reselection time, the neighboring cell is used as a target cell in cell reselection of the terminal device, and the terminal device reselects the target cell.

If the priority of the neighboring cell is equal to the priority of the serving cell and received signal strength of the serving cell is less than $S_{nonintrasearch}$ in the broadcast message, the terminal device measures the neighboring cell. If the neighboring cell meets the criterion S and a criterion R (Reselect, reselect), the neighboring cell is used as a target cell in cell reselection of the terminal device, and the terminal device reselects the target cell. The criterion R is $R_n > R_s$, where $R_s = Q_{meas,s} + Q_{Hyst}$, and $R_n = Q_{meas,n} - Q_{offset}$, $Q_{Hyst}$ is a hysteresis of the received signal strength of the serving cell, $Q_{offset}$ is an offset of the received signal strength of the neighboring cell, and $Q_{Hyst}$ and $Q_{offset}$ are used to prevent a ping-pong effect during cell reselection.

If the priority of the neighboring cell is lower than the priority of the serving cell, the received signal strength of the neighboring cell is less than $Thresh_{serving,low}$ in the broadcast message, and the received signal strength of the serving cell is greater than $Thresh_{x,low}$ in the broadcast message, the neighboring cell is used as a target cell in cell reselection of the terminal device, and the terminal device reselects the target cell.

However, when the terminal device is in a building or a basement, a signal sent by the base station to the terminal device is diffracted, reflected, or the like by an obstacle, a loss may occur in the signal that encounters the obstacle and that is received by the terminal device. Therefore, when the terminal device is in an idle state, a received signal communication parameter value obtained through measurement is relatively low, requirements of existing cell selection and cell reselection cannot be met, and the terminal device cannot communicate normally.

SUMMARY

Embodiments of the present invention provide an apparatus, a method, and a system for cell selection, so that a terminal device can communicate normally.

To achieve the foregoing objective, the following technical solutions are used in the embodiments of the present invention:

According to a first aspect, a terminal device is provided, including:

a first measurement unit, configured to measure a received signal communication parameter value of a first cell, where the first cell is a cell that can provide a communications service to the terminal device;

a first determining unit, configured to determine whether the communication parameter value is greater than a first threshold of the first cell, where the first threshold includes at least a sum of a first minimum threshold of a received signal communication parameter of the first cell and an offset of the first minimum threshold of the received signal communication parameter of the first cell;

a first obtaining unit, configured to: if the communication parameter value is less than or equal to the first threshold, obtain a second threshold from a broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell;

a second determining unit, configured to determine whether the communication parameter value is greater than the second threshold; and a first setting unit, configured to: if the communication parameter value is greater than the second threshold, set the first cell as a serving cell of the terminal device.

With reference to the first aspect, in a first implementable manner, the terminal device further includes:

a second measurement unit, configured to measure a received signal communication parameter value of a second cell, where the second cell is any neighboring cell of the first cell;

a second obtaining unit, configured to obtain a first threshold of the second cell or a first limit value of the second cell from the broadcast message, where the first threshold includes at least a sum of a first minimum threshold of the received signal communication parameter of the second cell and an offset of the first minimum threshold of the received signal communication parameter of the second cell;

a third determining unit, configured to determine whether the communication parameter value is greater than the first threshold, or whether a difference between the communication parameter value and the first threshold is greater than the first limit value; and a second setting unit, configured to: if the communication parameter value is greater than the first threshold, or the difference between the communication parameter value and the first threshold is greater than the first limit value, set the second cell as the serving cell of the terminal device; and the second setting unit is further configured to: if the communication parameter value is less than or equal to the first threshold, or the difference between the communication parameter value and the first threshold is less than or equal to the first limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

With reference to the first aspect, in a second implementable manner, the first setting unit is further configured to: if the received signal communication parameter value of the first cell is greater than the first threshold of the first cell, set the first cell as the serving cell of the terminal device;

the terminal device further includes:

a third measurement unit, configured to measure a received signal communication parameter value of a second cell, where the second cell is any neighboring cell of the first cell;

a third obtaining unit, configured to: when the received signal communication parameter value of the first cell is less than or equal to the first threshold of the first cell, obtain a second threshold of the second cell from the broadcast message, where the second threshold includes at least a sum of a second minimum threshold of the received signal communication parameter of the second cell and an offset of a first minimum threshold of the received signal communication parameter of the second cell, or when a difference between the received signal communication para value of the first cell and the first threshold of the first cell is less than or equal to a first limit value, obtain a second limit value of the second cell;

a fourth determining unit, configured to determine whether the received signal communication parameter value of the second cell is greater than the second threshold of the second cell, or whether a difference between the received signal communication parameter value of the second cell and the second threshold is greater than the second limit value; and a third setting unit, configured to: if the communication parameter value is greater than the second threshold, or the difference between the communication parameter value and the second threshold is greater than the second limit value, set the second cell as the serving cell of the terminal device; and the third setting unit is further configured to: if the communication parameter value of the second cell is less than or equal to the second threshold, or the difference between the communication parameter value and the second threshold is less than or equal to the second limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

With reference to the first aspect and the first and second implementable manners, in a third implementable manner, the terminal device further includes:

a receiving unit, configured to receive the broadcast message sent by a base station to which the first cell belongs, where the broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, a frequency priority parameter of the first cell, a frequency priority parameter of the second cell, or a cell selection level parameter.

With reference to the third implementable manner, in a fourth implementable manner, the receiving unit is further configured to:

repeatedly detect the broadcast message until the broadcast message is detected, and receive the broadcast message.

With reference to the first and second implementable manners, in a fifth implementable manner, the terminal device further includes:

a sending unit, configured to send an update message to a base station, so that the base station transparently transmits the update message to a mobility management entity, and the mobility management entity pages the terminal device according to the update message, where the update message includes at least one of an identifier of the second cell, the hysteresis of the received signal communication parameter, the offset of the received signal communication parameter, or the second limit value.

With reference to the first aspect and the first to fifth implementable manners, in a sixth implementable manner, the communication parameter is received signal strength or received signal quality;

when the communication parameter is the received signal strength, the first threshold is $A+A1+C$, where $A$ is a minimum threshold of a received signal strength value, $A1$ is an offset of the minimum threshold of the received signal strength value, and $C$ is a compensation; and when the communication parameter is the received signal quality, the first threshold is $B+B1$, where $B$ is a minimum threshold of a received signal quality value, and B1 is an offset of the minimum threshold of the received signal quality value.

According to a second aspect, a base station is provided, including:

an obtaining unit, configured to obtain a broadcast message, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and a sending unit, configured to send the broadcast message to a terminal device, so that the terminal device selects a cell according to the broadcast message.

With reference to the second aspect, in a first implementable manner, the Obtaining unit is specifically configured to:

obtain the broadcast message locally or from a request message, a response message, or an update message sent by a second base station to the first base station.

With reference to the first implementable manner, in a second implementable manner, the sending unit is further configured to:

repeatedly send the broadcast message to the terminal device, so that the terminal device selects a cell according to the broadcast message.

With reference to the second aspect, in a third implementable manner, the base station further includes:

a receiving unit, configured to receive an update message sent by the terminal device, where the update message includes at least one of an identifier of the second cell, the hysteresis of the received signal communication parameter of the first cell, the offset of the received signal communication parameter of the second cell, or the second limit value, so as to transparently transmit the update message to a mobility management entity, so that the mobility management entity pages the terminal device according to the update message.

According to a third aspect, a communications system is provided, including:

at least one of any terminal device described above or any base station described above.

According to a fourth aspect, a terminal device is provided, including:

a processor, configured to measure a received signal communication parameter value of a first cell, where the first cell is a cell that can provide a communications service to the terminal device, where the processor is further configured to determine whether the communication parameter value is greater than a first threshold of the first cell, where the first threshold includes at least a sum of a first minimum threshold of a received signal communication parameter of the first cell and an offset of the first minimum threshold of the received signal communication parameter of the first cell;

the processor is further configured to: if the communication parameter value is less than or equal to the first threshold, obtain a second threshold from a broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell;

the processor is further configured to determine whether the communication parameter value is greater than the second threshold; and the processor is further configured to: if the communication parameter value is greater than the second threshold, set the first cell as a serving cell of the terminal device.

With reference to the fourth aspect, in a first implementable manner, the processor is further configured to measure a received signal communication parameter value of a second cell, where the second cell is any neighboring cell of the first cell;

the processor is further configured to obtain a first threshold of the second cell or a first limit value of the second cell from the broadcast message, where the first threshold includes at least a sum of a first minimum threshold of the received signal communication parameter of the second cell and an offset of the first minimum threshold of the received signal communication parameter of the second cell;

the processor is further configured to determine whether the communication parameter value is greater than the first threshold, or whether a difference between the communication parameter value and the first threshold is greater than the first limit value;

the processor is further configured to: if the communication parameter value is greater than the first threshold, or the difference between the communication parameter value and the first threshold is greater than the first limit value, set the second cell as the serving cell of the terminal device; and the processor is further configured to: if the communication parameter value is less than or equal to the first threshold, or the difference between the communication parameter value and the first threshold is less than or equal to the first limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

With reference to the fourth aspect, in a second implementable manner, the processor is further configured to: if the received signal communication parameter value of the first cell is greater than the first threshold of the first cell, set the first cell as the serving cell of the terminal device;

the processor is further configured to measure a received signal communication parameter value of a second cell, where the second cell is any neighboring cell of the first cell;

the processor is further configured to: when the received signal communication parameter value of the first cell is less than or equal to the first threshold of the first cell, obtain a second threshold of the second cell from the broadcast message, where the second threshold includes at least a sum of a second minimum threshold of the received signal communication parameter of the second cell and offset of a first minimum threshold of the received signal communication parameter of the second cell, or when a difference between the received signal communication parameter value of the first cell and the first threshold of the first cell is less than or equal to a first limit value, obtain a second limit value of the second cell;

the processor is further configured to determine whether the received signal communication parameter value of the second cell is greater than the second threshold of the second cell, or whether a difference between the received signal communication parameter value of the second cell and the second threshold is greater than the second limit value;

the processor is further configured to: if the communication parameter value is greater than the second threshold, or the difference between the communication parameter value and the second threshold is greater than the second limit value, set the second cell as the serving cell of the terminal device; and the processor is further configured to: if the communication parameter value of the second cell is less than or equal to the second threshold, or the difference between the communication parameter value and the second threshold is less than or equal to the second limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

With reference to the fourth aspect and the first and second implementable manners, in a third implementable manner, the terminal device further includes:

a receiver, configured to receive the broadcast message sent by a base station to which the first cell belongs, where the broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, a frequency priority parameter of the first cell, a frequency priority parameter of the second cell, or a cell selection level parameter.

With reference to the third implementable manner, in a fourth implementable manner, the receiver is further configured to:

repeatedly detect the second broadcast message until the broadcast message is detected, and receive the second broadcast message.

With reference to the first and second implementable manners, in a fifth implementable manner, the terminal device further includes:

a transmitter, configured to send an update message to a base station, so that the base station transparently transmits the update message to a mobility management entity, and the mobility management entity pages the terminal device according to the update message, where the update message includes at least one of an identifier of the second cell, the hysteresis of the received signal communication parameter, the offset of the received signal communication parameter, or the second limit value.

With reference to the fourth aspect and the first to fifth implementable manners, in a sixth implementable manner, the communication parameter is received signal strength or received signal quality;

when the communication parameter s the received signal strength, the first threshold is A+A1+C, where A is a minimum threshold of a received signal strength value, A1 is an offset of the minimum threshold of the received signal strength value, and C is a compensation; and when the communication parameter is the received signal quality, the first threshold is B+B1, where B is a minimum threshold of a received signal quality value, and B1 is an offset of the minimum threshold of the received signal quality value.

According to a fifth aspect, a base station is provided, including:

a processor, configured to obtain a broadcast message, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and a transmitter, configured to send the broadcast message to a terminal device, so that the terminal device selects a cell according to the broadcast message.

With reference to the fifth aspect, in a first implementable manner, the processor is specifically configured to:

obtain the broadcast message locally or from a request message, a response message, or an update message sent by a second base station to the first base station.

With reference to the first implementable manner, in a second implementable manner, the processor is further configured to:

repeatedly send the broadcast message to the terminal device, so that the terminal device selects a cell according to the broadcast message.

With reference to the second aspect, in a third implementable manner, the base station further includes:

a receiver, configured to receive an update message sent by the terminal device, where the update message includes at least one of an identifier of the second cell, the hysteresis of the received signal communication parameter of the first cell, the offset of the received signal communication parameter of the second cell, or the second limit value, so as to transparently transmit the update message to a mobility management entity, so that the mobility management entity pages the terminal device according to the update message.

According to a sixth aspect, a communications system is provided, including:

at least one of any terminal device described above or any base station described above.

According to a seventh aspect, a method for cell selection is provided, applied to a terminal device, including:

measuring a received signal communication parameter value of a first cell, where the first cell is a cell that can provide a communications service to the terminal device;

determining whether the communication parameter value is greater than a first threshold of the first cell, where the first threshold includes at least a sum of a first minimum threshold of a received signal communication parameter of the first cell and an offset of the first minimum threshold of the received signal communication parameter of the first cell;

if the communication parameter value is less than or equal to the first threshold, obtaining a second threshold from a broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell;

determining whether the communication parameter value is greater than the second threshold; and if the communication parameter value is greater than the second threshold, setting the first cell as a serving cell of the terminal device.

With reference to the first aspect, in a first implementable manner, after the setting the first cell as a serving cell of the terminal device, the method further includes:

measuring a received signal communication parameter value of a second cell, where the second cell is any neighboring cell of the first cell;

obtaining a first threshold of the second cell or a first limit value of the second cell from the broadcast message, where the first threshold includes at least a sum of a first minimum threshold of the received signal communication parameter of the second cell and an offset of the first minimum threshold of the received signal communication parameter of the second cell;

determining whether the communication parameter value is greater than the first threshold, or whether a difference between the communication parameter value and the first threshold is greater than the first limit value; and if the communication parameter value is greater than the first threshold, or the difference between the communication parameter value and the first threshold is greater than the first limit value, setting the second cell as the serving cell of the terminal device; or if the communication parameter value is less than or equal to the first threshold, or the difference between the communication parameter value and the first threshold is less than or equal to the first limit value, obtaining, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

With reference to the seventh aspect, in a second implementable manner, after the determining whether the communication parameter value is greater than a first threshold of the first cell, the method further includes:

if the received signal communication parameter value of the first cell is greater than the first threshold of the first cell, setting the first cell as the serving cell of the terminal device;

measuring a received signal communication parameter value of a second cell, where the second cell is any neighboring cell of the first cell;

when the received signal communication parameter value of the first cell is less than or equal to the first threshold of the first cell, obtaining a second threshold of the second cell from the broadcast message, where the second threshold includes at least a sum of a second minimum threshold of the received signal communication parameter of the second cell and an offset of a first minimum threshold of the received signal communication parameter of the second cell, or when a difference between the received signal communication parameter value of the first cell and the first threshold of the first cell is less than or equal to a first limit value, obtaining a second limit value of the second cell;

determining whether the received signal communication parameter value of the second cell is greater than the second threshold of the second cell, or whether a difference between the received signal communication parameter value of the second cell and the second threshold is greater than the second limit value; and if the communication parameter value is greater than the second threshold, or the difference between the communication parameter value and the second threshold is greater than the second limit value, setting the second cell as the serving cell of the terminal device; or if the communication parameter value of the second cell is less than or equal to the second threshold, or the difference between the communication parameter value and the second threshold is less than or equal to the second limit value, obtaining, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

With reference to the seventh aspect and the first and second implementable manners, in a third implementable manner, before the measuring a received signal communication parameter value of a first cell or the measuring a received signal communication parameter value of a second cell, the method further includes:

receiving the broadcast message sent by a base station to which the first cell belongs, where the broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, a frequency priority parameter of the first cell, a frequency priority parameter of the second cell, or a cell selection level parameter.

With reference to the third implementable manner, in a fourth implementable manner, the receiving the broadcast message sent by a base station to which the first cell belongs includes:

repeatedly detecting the broadcast message until the broadcast message is detected, and receiving the broadcast message.

With reference to the first and second implementable manners, in a fifth implementable manner, after the setting the second cell as the serving cell of the terminal device, the method further includes:

sending an update message to a base station, so that the base station transparently transmits the update message to a mobility management entity, and the mobility management entity pages the terminal device according to the update message, where the update message includes at least one of an identifier of the second cell, the hysteresis of the received signal communication parameter, the offset of the received signal communication parameter, or the second limit value.

With reference to the first aspect and the first to fifth implementable manners, in a sixth implementable manner, the communication parameter is received signal strength or received signal quality;

when the communication parameter is the received signal strength, the first threshold is A+A1+C, where A is a minimum threshold of a received signal strength value, A1 is an offset of the minimum threshold of the received signal strength value, and C is a compensation; and when the communication parameter is the received signal quality, the first threshold is B+B1, where B is a minimum threshold of a received signal quality value, and B1 is an offset of the minimum threshold of the received signal quality value.

According to an eighth aspect, a method for cell selection is provided, applied to a base station, including:

obtaining a broadcast message, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and sending the broadcast message to a terminal device, so that the terminal device selects a cell according to the broadcast message.

With reference to the eighth aspect, in a first implementable manner, the obtaining a broadcast message includes:

obtaining the broadcast message locally or from a request message, a response message, or an update message sent by a second base station to the first base station.

With reference to the first implementable manner, in a second implementable manner, the sending the broadcast message to a terminal device includes:

repeatedly sending the broadcast message to the terminal device, so that the terminal device selects a cell according to the broadcast message.

With reference to the eighth aspect, in a third implementable manner, after the sending the broadcast message to a terminal device, the method further includes:

receiving an update message sent by the terminal device, where the update message includes at least one of an identifier of the second cell, the hysteresis of the received signal communication parameter of the first cell, the offset of the received signal communication parameter of the second cell, or the second limit value, so as to transparently transmit the update message to a mobility management entity, so that the mobility management entity pages the terminal device according to the update message.

The embodiments of the present invention provide an apparatus, a method, and a system for cell selection. The apparatus for cell selection includes: a first measurement unit, configured to measure a received signal communication parameter value of a first cell, where the first cell is a cell that can provide a communications service to the terminal device; a first determining unit, configured to determine whether the communication parameter value is greater than a first threshold of the first cell, where the first threshold includes at least a sum of a first minimum threshold of a received signal communication parameter of the first cell and an offset of the first minimum threshold of the received signal communication parameter of the first cell; a first obtaining unit, configured to: if the communication parameter value is less than or equal to the first threshold, obtain a second threshold from a broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell; a second determining unit, configured to determine whether the communication parameter value is greater than the second threshold; and a first setting unit, configured to: if the communication parameter value is greater than the second threshold, set the first cell as a serving cell of the terminal device. In this way, when the received signal communication parameter value of the first cell that is obtained through measurement is less than or equal to the first threshold of the first cell, the second threshold is obtained, it is determined that the communication parameter value is greater than the second threshold, and the first cell is set as the serving cell of the terminal device, so that when the terminal device is in an idle state, a received signal communication parameter value obtained through measurement meets a cell selection requirement, and the terminal device can communicate normally.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
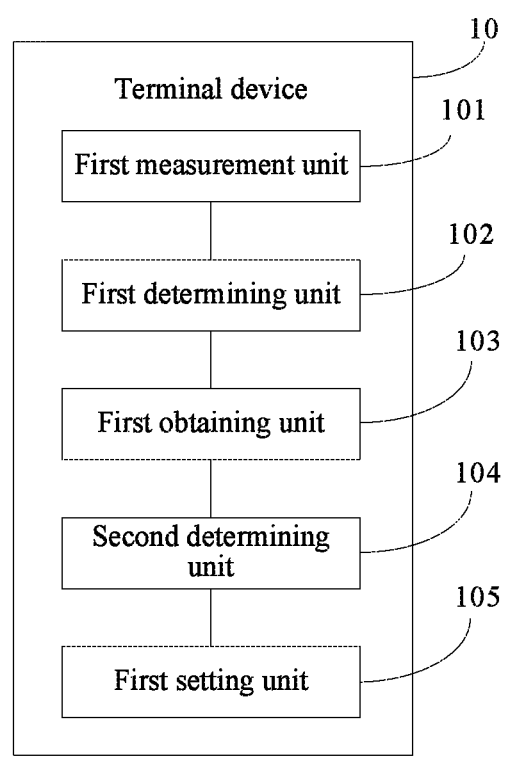
FIG. 1 is a schematic structural diagram of a terminal device according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

This embodiment of the present invention provides a terminal device. First, the terminal device selects, by means of non-coverage enhancement, a cell that can provide a communications service to the terminal device. Assuming that the terminal device detects that a first cell meets a requirement of providing the communications service to the terminal device, the terminal device sets the first cell as a serving cell of the terminal device. If the first cell does not meet the requirement of providing the communications service to the terminal device, the terminal device selects the first cell by means of coverage enhancement, so that the first cell meets the requirement of providing the communications service to the terminal device, and the terminal device sets the first cell as the serving cell of the terminal device.

The non-coverage enhancement is: The terminal device first measures a received signal communication parameter value of the first cell that can provide the communications service to the terminal device, obtains a first threshold of the first cell, then determines whether the communication parameter value is greater than the first threshold, and if the communication parameter value is greater than the first threshold, sets the first cell as the serving cell of the terminal device. A communication parameter is received signal strength or received signal quality.

When the communication parameter is the received signal strength, the first threshold includes a sum of a first minimum threshold of the received signal strength, an offset of the first minimum threshold of the received signal strength, and a compensation. During actual application, the first minimum threshold of the received signal strength may be represented by $Q_{rxlevmin}$, and may be a minimum received signal strength value in cell selection, the offset of the first minimum threshold of the received signal strength may be represented by $Q_{rxlevminoffset}$, and may be an offset of the minimum received signal strength value in cell selection, and the compensation may be represented by $P_{compensation}$, and $P_{compensation}=\text{Max}(P_{EMax}-P_{UMax}, 0)$, where $P_{EMax}$ is a maximum uplink transmit power allowed for the terminal device in the cell, and $P_{UMax}$ is a maximum uplink transmit power determined by a capability of the terminal device. $Q_{rxlevmin}$, $Q_{rxlevminoffset}$, and $P_{EMax}$ are obtained from a broadcast message sent by a base station to which the cell measured by the terminal device belongs. A received signal strength value obtained through measurement may be represented by $Q_{rxlevmeas}$. Therefore, when the received signal strength value obtained by the terminal device through measurement is greater than the first threshold, that is, $Q_{rxlevmeas}>(Q_{rxlevmin}+Q_{rxlevminoffset})+P_{compensation}$, the cell measured by the terminal device is set as the serving cell of the terminal device.

When the communication parameter is the received signal quality, the first threshold includes a sum of a first minimum threshold of the received signal quality and an offset of the first minimum threshold of the received signal quality. During actual application, the first minimum threshold of the received signal quality may be represented by $Q_{qualmin}$, and may be a minimum received signal quality value in cell selection, and the offset of the first minimum threshold of the received signal quality may be represented by $Q_{qualminoffset}$, and may be an offset of the minimum received signal quality value in cell selection. A received signal quality value obtained through measurement may be represented by $Q_{qualmeas}$. Therefore, when the received signal quality value obtained by the terminal device through measurement is greater than the first threshold, that is, $Q_{qualmeas}>(Q_{qualmin}+Q_{qualminoffset})$, the cell measured by the terminal device is set as the serving cell of the terminal device.

It should be noted that, when $S_{rxlev}=Q_{rxlevmeas}-(Q_{rxlevmin}+Q_{rxlevminoffset})-P_{compensation}$, $S_{rxlev}=Q_{qualmeas}-(Q_{qualmin}+Q_{qualminoffset})$, $S_{rxlev}>0$, and $S_{qual}>0$, a criterion S is met, where $S_{rxlev}$ may be a received signal strength value when the first cell is selected, and $S_{rxlev}$ may be a received signal quality value when the first cell selection is selected. In the present invention, the terminal device may meet at least one of $S_{rxlev}>0$ or $S_{qual}>0$, that is, at least one of that a received signal strength value obtained by the terminal device through measurement meets $S_{rxlev}>0$ or that a received signal quality value obtained by the terminal device through measurement meets $S_{qual}>0$, and the terminal device can camp on the measured cell.

When the terminal device performs cell reselection, if a frequency priority of the first cell is equal to a frequency priority of a second cell, where the second cell is a neighboring cell of the first cell, the terminal device determines whether $R_s$ is less than $R_n$, $R_s$ is a sum of a received signal strength value of the first cell and a first hysteresis of the received signal strength of the first cell, and $R_n$ is a difference between a received signal strength value of the second cell and a first offset of the received signal strength of the second cell. If $R_s$ is less than $R_n$, the first cell is set as the serving cell of the terminal device.

Generally, the first hysteresis of the received signal strength of the first cell may be represented by $Q_{Hyst}$, the first offset of the received signal strength of the second cell may be represented by $Q_{offset}$, $R_s=Q_{meas,s}+Q_{Hyst}$, $R_n=Q_{meas,s}-Q_{offset}$, and when $R_n>R_s$, a criterion R is met.

When the terminal device performs cell reselection, if the frequency priority of the first cell is higher than the frequency priority of the second cell, where the second cell is the neighboring cell of the first cell, the terminal device determines whether a difference between the communication parameter value of the first cell and the first threshold of the first cell is less than a first limit value of the first cell, and whether a difference between a communication parameter value of the second cell and a first threshold of the second cell is greater than a first limit value of the second cell.

If the difference between the communication parameter value of the first cell and the first threshold of the first cell is less than the first limit value of the first cell, and the difference between the communication parameter value of the second cell and the first threshold of the second cell is greater than the first limit value of the second cell, the first cell is set as the serving cell of the terminal device.

When the terminal device performs cell reselection, if the frequency priority of the first cell is lower than the frequency priority of the second cell, where the second cell is the neighboring cell of the first cell, the terminal device determines whether the difference between the communication parameter value of the second cell and the first threshold of the second cell is greater than the first limit value of the second cell, and if the difference between the communication parameter value of the second cell and the first threshold of the second cell is greater than the first limit value of the second cell, and sets the first cell as the serving cell of the terminal device.

The coverage enhancement is: When the received signal communication parameter value of the first cell that is obtained by the terminal device through measurement is less than or equal to the first threshold, the terminal device may obtain a second threshold locally or from the broadcast message, determine whether the received signal communication parameter value of the first cell is greater than the second threshold, and if the communication parameter value is greater than the second threshold, set the first cell as the serving cell of the terminal device.

When the communication parameter is the received signal strength, the second threshold includes a sum of the first minimum threshold of the received signal strength, an offset of a second minimum threshold of the received signal strength, and a compensation, or the second threshold includes a sum of a second minimum threshold of the received signal strength, the offset of the first minimum threshold of the received signal strength, and a compensation. The second minimum threshold of the received signal strength is less than the first minimum threshold of the received signal strength, and the offset of the second minimum threshold of the received signal strength is less than the offset of the first minimum threshold of the received signal strength. The offset of the second minimum threshold of the received signal strength may be represented by $Q_{rxlevminoffset\_ce}$, and the second minimum threshold of the received signal strength may be represented by $Q_{rxlevmin\_ce}$. Therefore, when a received signal strength value is greater than the second threshold, which may be represented by $Q_{rxlevmeas} > (Q_{rxlevmin} + Q_{rxlevminoffset\_ce}) + P_{compensation}$, the cell measured by the terminal device is set as the serving cell of the terminal device.

When the communication parameter is the received signal quality, the second threshold includes a sum of the first minimum threshold of the received signal quality and an offset of a second minimum threshold of the received signal quality, or the second threshold includes a sum of a second minimum threshold of the received signal quality and the offset of the first minimum threshold of the received signal quality. The second minimum threshold of the received signal quality is less than the first minimum threshold of the received signal quality, and the offset of the second minimum threshold of the received signal quality is less than the offset of the first minimum threshold of the received signal quality.

The offset of the second minimum threshold of the received signal quality may be represented by $Q_{qualminoffset\_ce}$, and the second minimum threshold of the received signal quality may be represented by $Q_{qualmin\_ce}$. Therefore, when a received signal quality value is greater than the second threshold, which may be represented by $Q_{qualmeas} > (Q_{rqualmin\_ce} + Q_{qualminoffset})$, the cell measured by the terminal device is set as the serving cell of the terminal device.

When the terminal device performs cell reselection, if the frequency priority of the first cell is equal to the frequency priority of the second cell, where the second cell is the neighboring cell of the first cell, the terminal device obtains $R_{s1}$ or $R_{n1}$, where $R_{s1}$ is a sum of a received signal strength value of the first cell and a second hysteresis of the received signal strength of the first cell, and $R_{n1}$ is a difference between a received signal strength value of the second cell and a second offset of the received signal strength of the second cell. The terminal device determines whether $R_{s1}$ is less than $R_{n1}$, and if $R_{s1}$ is less than $R_{n1}$, sets the second cell as the serving cell of the terminal device.

Generally, the second hysteresis of the received signal strength of the first cell may be represented by $Q_{Hyst\_ce}$, the second offset of the received signal strength of the second cell may be represented by $Q_{offset\_ce}$, $R_{s1} = Q_{meas,s} + Q_{Hyst\_ce}$, $R_{n1} = Q_{meas,n} - Q_{offset\_ce}$, and when $R_{n1} > R_{s1}$, the criterion R is met. The second hysteresis of the communication parameter is less than the first hysteresis of the communication parameter, and the second offset of the communication parameter is less than the first offset of the communication parameter.

When the terminal device performs cell reselection, if the frequency priority of the first cell is higher than the frequency priority of the second cell, where the second cell is the neighboring cell of the first cell, the terminal device determines whether a difference between the communication parameter value of the first cell and the second threshold of the first cell is less than a second limit value of the first cell, and whether a difference between the communication parameter value of the second cell and the second threshold of the second cell is greater than a second limit value of the second cell.

If the difference between the communication parameter value of the first cell and the second threshold of the first cell is less than the second limit value of the first cell, and the difference between the communication parameter value of the second cell and the second threshold of the second cell is greater than the second limit value of the second cell, the second cell is set as the serving cell of the terminal device.

When the terminal device performs cell reselection, if the frequency priority of the first cell is lower than the frequency priority of the second cell, where the second cell is the neighboring cell of the first cell, the terminal device determines whether the difference between the communication parameter value of the second cell and the second threshold of the second cell is greater than the second limit value of the second cell, and if the difference between the communication parameter value of the second cell and the second threshold of the second cell is greater than the second limit value of the second cell, sets the second cell as the serving cell of the terminal device.

It should be noted that, after the terminal device selects, by means of coverage enhancement, a cell to be camped on, the terminal device needs to obtain a coverage enhancement level from the broadcast message received by the terminal device, that is, a level parameter of the cell selected by the terminal device. A cell level parameter includes a high coverage enhancement level, a medium coverage enhancement level, and a low coverage enhancement level. The coverage enhancement level indicates that after the terminal device camps on a cell that is suitable to provide the communications service to the terminal device, when the terminal device exchanges a message with the base station, the terminal device may determine, according to a received signal communication parameter value of the cell that is obtained by the terminal device through measurement, to use the high coverage enhancement level, the medium coverage enhancement level, or the low coverage enhancement level. Exemplarily, when the received signal communication parameter value of the cell that is obtained by the terminal device through measurement is relatively low, the high coverage enhancement level may be used. When the received signal communication parameter value of the cell that is obtained by the terminal device through measurement is relatively high, the medium coverage enhancement level or the low coverage enhancement level may be used.

Details are described in the following embodiments related to the present invention.

Embodiment 2

This embodiment of the present invention provides a terminal device 10. It is assumed that the terminal device performs initial cell selection by means of coverage enhancement. As shown in FIG. 1, the terminal device includes: a first measurement unit 101, a first determining unit 102, a first obtaining unit 103, a second determining unit 104, and a first setting unit 105.

The first measurement unit 101 is configured to measure a received signal communication parameter value of a first cell, where the first cell is a cell that can provide a communications service to the terminal device.

A communication parameter is received signal strength or received signal quality, and the communication parameter value may be a received signal strength value or a received signal quality value.

The first determining unit 102 is configured to determine whether the communication parameter value is greater than a first threshold of the first cell, where the first threshold includes at least a sum of a first minimum threshold of the received signal communication parameter of the first cell and an offset of the first minimum threshold of the received signal communication parameter of the first cell.

If the received signal communication parameter value obtained through measurement is greater than the first threshold, the first cell is set as a serving cell of the terminal device.

If the received signal communication parameter value obtained through measurement is less than or equal to the first threshold, a second threshold is obtained.

It should be noted that, the terminal device may receive a broadcast message sent by a base station to which the first cell belongs, and obtain the first threshold from the broadcast message. The first threshold includes at least the sum of the first minimum threshold of the communication parameter and the offset of the first minimum threshold of the communication parameter.

When the communication parameter is the received signal strength, the first threshold is A+A1+C, where A is a minimum value of the received signal strength value, A1 is an offset of the minimum value of the received signal strength value, and C is a compensation.

When the communication parameter is the received signal quality, the first threshold is B+B1, where B is a minimum value of the received signal quality value, and B1 is an offset of the minimum value of the received signal quality value.

In this embodiment of the present invention, it is assumed that the communication parameter value is less than or equal to the first threshold, and the second threshold is obtained.

The first obtaining unit 103 is configured to: if the communication parameter value is less than or equal to the first threshold, obtain the second threshold from the broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell.

The second minimum threshold of the communication parameter is less than the first minimum threshold of the communication parameter, and the offset of the second minimum threshold of the communication parameter is less than the offset of the first minimum threshold of the communication parameter. In this way, the second threshold is less than the first threshold, so that the terminal device may set the first cell as the serving cell of the terminal device.

It should be noted that, when the terminal device is in a coverage enhancement state, the terminal device may repeatedly detect the broadcast message until the broadcast message is detected, and receive the broadcast message.

The second determining unit 104 is configured to determine whether the communication parameter value is greater than the second threshold.

If the received signal communication parameter value of the first cell that is obtained through measurement is greater than the second threshold of the first cell, the first cell is set as the serving cell of the terminal device.

If the received signal communication parameter value of the first cell that is obtained through measurement is less than or equal to the second threshold of the first cell, a third threshold is obtained.

In this embodiment of the present invention, it is assumed that the received signal communication parameter value of the first cell that is obtained through measurement is greater than the second threshold of the first cell, and the first cell is set as the serving cell of the terminal device.

The first setting unit 105 is configured to: if the communication parameter value is greater than the second threshold, set the first cell as the serving cell of the terminal device.

In this way, when a received signal communication parameter value of a first cell that is obtained through measurement is less than or equal to a first threshold of the first cell, a second threshold is obtained, it is determined that the communication parameter value is greater than the second threshold, and the first cell is set as a serving cell of the terminal device, so that when the terminal device is in an idle state, a received signal communication parameter value obtained through measurement meets a cell selection requirement, and the terminal device can communicate normally.

Exemplarily, it is assumed that the communication parameter is the received signal strength. Generally, the received signal strength value of the first cell that is obtained through measurement may be represented by $Q_{rxlevmeas}$, a first minimum threshold of the received signal strength of the first cell may be represented by $Q_{rxlevmin}$, an offset of the first minimum threshold of the received signal strength of the first cell may be represented by $Q_{rxlevminoffset}$, a compensation may be represented by $P_{compensation}$, and the first threshold may be represented by $(Q_{rxlevmin}+Q_{rxlevminoffset})+P_{compensation}$. When the received signal strength value of the first cell obtained through measurement is less than or equal to the first threshold, that is, $Q_{rxlevmeas} \leq (Q_{rxlevmin}+Q_{rxlevminoffset})+P_{compensation}$, the second threshold of the first cell is obtained.

A second minimum threshold of the received signal strength of the first cell may be represented by $Q_{rxlevmin\_ce}$, an offset of the second minimum threshold of the received signal strength of the first cell may be represented by $Q_{rxlevminoffset\_ce}$, and the second threshold may be represented by $(Q_{rxlevmin}+Q_{rxlevminoffset\_ce})+P_{compensation}$ or $(Q_{rxlevmin\_ce}+Q_{rxlevminoffset})+P_{compensation}$. When the received signal strength value obtained through measurement is greater than the second threshold, that is, $Q_{rxlevmeas} > (Q_{rxlevmin}+Q_{rxlevminoffset\_ce})+P_{compensation}$ or $Q_{rxlevmeas} >$ ($Q_{rxlevmin\_ce}$+$Q_{rxlevminoffset}$)+$P_{compensation}$, the first cell is set as the serving cell of the terminal device.

$P_{compensation}$=Max($P_{EMax}$-$P_{UMax}$, 0), where $P_{EMax}$ is maximum uplink transmit power allowed for the terminal device in the first cell, and is obtained from the broadcast message. $P_{UMax}$ is a maximum uplink transmit power determined by a capability of the terminal device, $P_{compensation}$=Max($P_{EMax}$-$P_{UMax}$,0) instructs to obtain a maximum value from 0 and a difference between the maximum uplink transmit power allowed for the terminal device in the first cell and the maximum uplink transmit power determined by the capability of the terminal device, and $P_{compensation}$ is a value greater than or equal to 0. When $P_{EMax}$ is greater than $P_{UMax}$, and $P_{compensation}$ is greater than 0, an access range of the terminal device at a cell edge is reduced, to avoid problems such as service drop and access failure caused due to insufficient transmit power of the terminal device. When $P_{EMax}$ is less than $P_{UMax}$, and $P_{compensation}$ is equal to 0, the terminal device may camp on the cell according to the maximum uplink transmit power and access a network. $Q_{rxlevminoffset}$ is used as a compensation value of $Q_{rxlevmin}$ only when the terminal device periodically searches for a high-priority PLMN (Public Land Mobile Network, public land mobile network). $Q_{rxlevmeas}$ is an actual value of RSRP (Reference Signal Receiving Power, reference signal received power) of the first cell that is obtained by the terminal device through measurement During actual application, $Q_{rxlevmin}$ is an integer, and may be any negative integer from −70 to −22, and $Q_{rxlevminoffset}$ is also an integer, and may be any integer from 1 to 8.

It is assumed that the received signal strength value $Q_{rxlevmeas}$ of the first cell that is obtained through measurement is −45, the first minimum threshold $Q_{rxlevmin}$ of the received signal strength of the first cell is −50, the offset $Q_{rxlevminoffset}$ of the first minimum threshold of the received signal strength of the first cell is 7, and the compensation $P_{compensation}$ is 0. Then the first threshold is −50+7+0. It is determined whether the received signal strength value of the first cell that is obtained through measurement is greater than the first threshold of the first cell, and the received signal strength value obtained through measurement is less than the first threshold, that is, −45<−50+7+0. Then the terminal device obtains the second threshold of the first cell from the broadcast message, and determines whether the received signal strength value of the first cell that is obtained through measurement is greater than the second threshold of the first cell.

It is assumed that the second minimum threshold $Q_{rxlevmin\_ce}$ of the received signal strength of the first cell that is included in the broadcast message is −55, the received signal strength value $Q_{rxlevmeas}$ of the first cell that is obtained through measurement is −45, the offset $Q_{rxlevminoffset}$ of the first minimum threshold of the received signal strength of the first cell is 7, and the compensation $P_{compensation}$ is 0. Then the second threshold is −55+7+0. It is determined whether the received signal strength value of the first cell that is obtained through measurement is greater than the second threshold of the first cell, and the received signal strength value of the first cell that is obtained through measurement is greater than the second threshold of the first cell, that is, −45>−55+7+0. Then the first cell is set as the serving cell of the terminal device.

Alternatively, it is assumed that the offset $Q_{rxlevminoffset\_ce}$ of the second minimum threshold of the received signal strength of the first cell that is included in the broadcast message is 2, the received signal strength value $Q_{rxlevmeas}$ of the first cell that is obtained through measurement is −45, the first minimum threshold $Q_{rxlevmin}$ of the received signal strength of the first cell is −50, and the compensation $P_{compensation}$ is 0. Then the second threshold is −50+2+0. It is determined whether the received signal strength value of the first cell that is obtained through measurement is greater than the second threshold of the first cell, and the received signal strength value of the first cell that is obtained through measurement is greater than the second threshold of the first cell, that is, −45>−50+2+0. Then the first cell is set as the serving cell of the terminal device.

Particularly, the terminal device may further obtain a common offset from the broadcast message, where the common offset may be represented by $Q_{offset}$, and the common offset $Q_{offset}$ is enumerated, and may be any one of −24, −22, −20, −18, −16, −14, −12, −10, −8, −6, −5, −4, −3, −2, −1, 0, 1, 2, 3, 4, 5, 6, 8, 10, 12, 14, 16, 18, 20, 22, and 24. When the received signal strength value of the first cell that is obtained through measurement is less than or equal to the first threshold of the first cell, the first threshold of the first cell is reduced by using the common offset, so as to obtain the second threshold of the first cell, so that the received signal strength value of the first cell that is obtained through measurement is greater than the second threshold of the first cell, and the first cell is set as the serving cell of the terminal device.

Exemplarily, it is assumed that the received signal strength value $Q_{rxlevmeas}$ of the first cell that is obtained through measurement is −45, the first minimum threshold $Q_{rxlevmin}$ of the received signal strength of the first cell is −50, the offset $Q_{rxlevminoffset}$ of the first minimum threshold of the received signal strength of the first cell is 7, the compensation $P_{compensation}$ is 0, and the common offset $Q_{offset}$ is 3. Then the first threshold is −50−3+7+0. It is determined whether the received signal strength value of the first cell that is obtained through measurement is greater than the second threshold of the first cell, and the received signal strength value obtained through measurement is greater than the second threshold of the first cell, that is, 45>−50−3+7+0. Then the first cell is set as the serving cell of the terminal device.

It should be noted that, when the terminal device performs cell selection for the first time, the terminal device may also directly obtain, locally or from the broadcast message, the second minimum threshold of the received signal strength of the first cell or the offset of the second minimum threshold of the received signal strength, to obtain the second threshold of the first cell, determine whether the received signal strength value of the first cell that is obtained through measurement is greater than the second threshold of the first cell, and if the received signal strength value of the first cell that is obtained through measurement is greater than the second threshold of the first cell, set the first cell as the serving cell of the terminal device. In this way, the terminal device may quickly select a suitable cell for the terminal device to camp on, a cell selection time of the terminal device is reduced, and the terminal device communicates normally.

Embodiment 3

Figure 2:
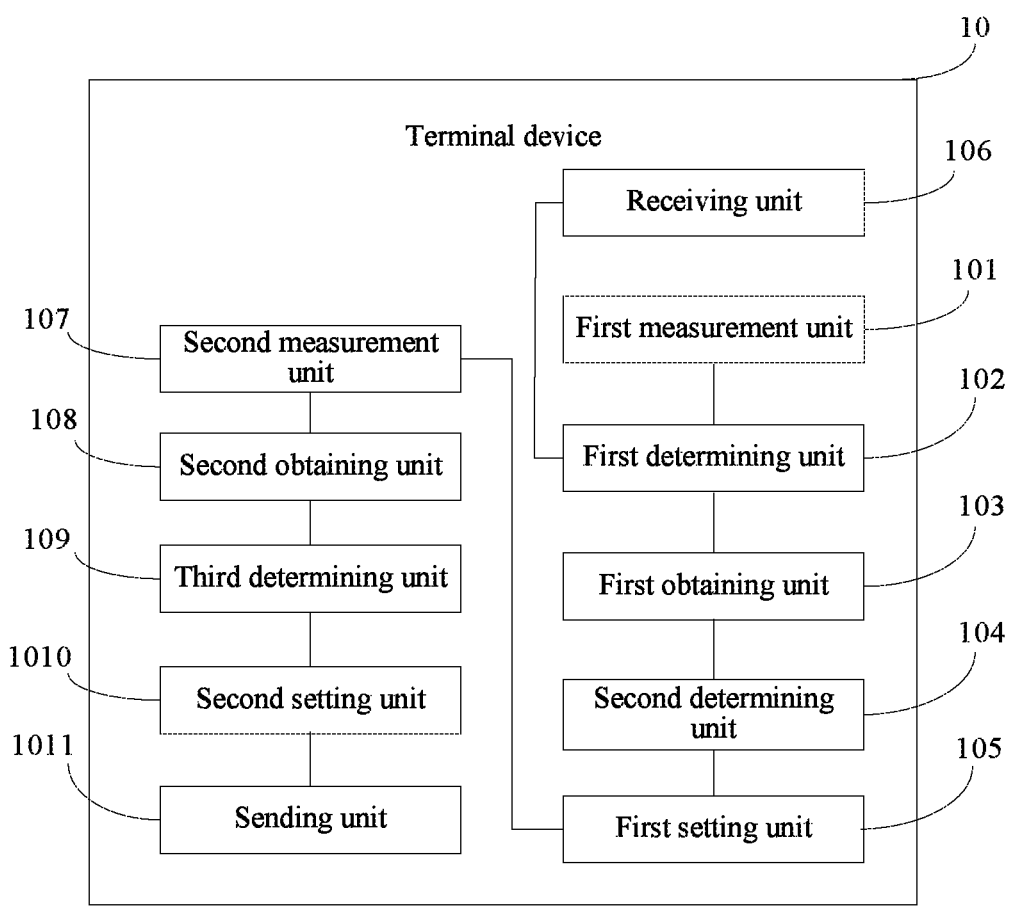
FIG. 2 is a schematic structural diagram of another terminal device according to an embodiment of the present invention.

This embodiment of the present invention provides a terminal device 10. It is assumed that the terminal device reselects a second cell by means of non-coverage enhancement based on that the terminal device selects a first cell as a serving cell by means of coverage enhancement in Embodiment 2. As shown in FIG. 2, the terminal device includes: a first measurement unit 101, a first determining unit 102, a first obtaining unit 103, a second determining unit 104, a first setting unit 105, a receiving unit 106, a second measurement unit 107, a second obtaining unit 108, a third determining unit 109, a second setting unit 1010, and a sending unit 1011.

The receiving unit 106 is configured to receive a broadcast message sent by a base station to which the first cell belongs.

The broadcast message includes at least one of a second minimum threshold of a communication parameter, an offset of the second minimum threshold of the communication parameter, a hysteresis of the received signal communication parameter of the first cell, an offset of the received signal communication parameter of the second cell, a second limit value of the second cell, a frequency priority parameter of the first cell, a frequency priority parameter of the second cell, or a cell selection level parameter.

It should be noted that, the terminal device may repeatedly detect the broadcast message until the broadcast message is detected, and receive the broadcast message.

The first measurement unit 101 is configured to measure a received signal communication parameter value of the first cell, where the first cell is a cell that can provide a communications service to the terminal device.

Before the terminal device measures the received signal communication parameter value of the first cell, when the terminal device is switched on or enters a signal coverage area from a coverage hole, the terminal device needs to detect a cell that can provide the communications service to the terminal device, and camp on the cell. If the terminal device does not store information about the cell that can provide the communications service to the terminal device, the terminal device searches an entire frequency band supported by the terminal device, and when the terminal device finds a frequency having a relatively strong frequency, the terminal device may measure a cell of the frequency, so that the terminal device camps on the cell. In this embodiment of the present invention, it is assumed that the terminal device finds the first cell after searching the entire frequency band, where the first cell is a cell that is detected by the terminal device and that can provide the communications service to the terminal device.

It should be noted that, if the terminal device stores information about the cell that can provide the communications service to the terminal device, the terminal device first measures the cell, and if the cell can provide the communications service to the terminal device, the terminal device camps on the cell. A process in which the terminal device searches the entire frequency band belongs to the prior art, and is not described in this embodiment of the present invention.

The first determining unit 102 is configured to determine whether the communication parameter value is greater than a first threshold of the first cell, where the first threshold includes at least a sum of a first minimum threshold of the received signal communication parameter of the first cell and an offset of the first minimum threshold of the received signal communication parameter of the first cell.

The terminal device receives the broadcast message sent by the base station to which the first cell belongs, where the broadcast message includes at least the first minimum threshold of the received signal communication parameter and the offset of the first minimum threshold of the received signal communication parameter.

The first obtaining unit 103 is configured to: if the communication parameter value is less than or equal to the first threshold, obtain a second threshold from the broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell.

The second minimum threshold of the communication parameter is less than the first minimum threshold of the communication parameter, and the offset of the second minimum threshold of the communication parameter is less than the offset of the first minimum threshold of the communication parameter. In this way, the second threshold is less than the first threshold.

It should be noted that, the terminal device may also obtain locally the second minimum threshold of the communication parameter or the offset of the second minimum threshold of the communication parameter.

The second determining unit 104 is configured to determine whether the communication parameter value is greater than the second threshold.

The first setting unit 105 is configured to: if the communication parameter value is greater than the second threshold, set the first cell as the serving cell of the terminal device.

The second measurement unit 107 is configured to measure a received signal communication parameter value of the second cell, where the second cell is any neighboring cell of the first cell.

When the communication parameter value of the first cell that is obtained by the terminal device through measurement is greater than the second threshold of the first cell, the first cell is set as the serving cell of the terminal device, so that after the terminal device communicates normally, the terminal device may constantly measure the communication parameter value of the first cell and the communication parameter value of the second cell, where the second cell is any neighboring cell of the first cell.

The second obtaining unit 108 is configured to obtain a first threshold of the second cell or a first limit value of the second cell from the broadcast message, where the first threshold includes at least a sum of a first minimum threshold of the received signal communication parameter of the second cell and an offset of the first minimum threshold of the received signal communication parameter of the second cell.

The third determining unit 109 is configured to determine whether the communication parameter value is greater than the first threshold, or whether a difference between the communication parameter value and the first threshold is greater than the first limit value.

The second setting unit 1010 is configured to: if the communication parameter value is greater than the first threshold, or the difference between the communication parameter value and the first threshold is greater than the first limit value, set the second cell as the serving cell of the terminal device.

When the terminal device obtains the first threshold of the second cell from the broadcast message, and determines that the communication parameter value of the second cell is greater than the first threshold, the terminal device sets the second cell as the serving cell of the terminal device. When the terminal device obtains the first limit value of the second cell from the broadcast message, and determines that the difference between the communication parameter value of the second cell and the first threshold is greater than the first limit value, the terminal device sets the second cell as the serving cell of the terminal device.

Particularly, the second setting unit of the terminal device may also set the second cell as the serving cell of the terminal device according to that the difference between the communication parameter value of the second cell and the first threshold is greater than the second limit value.

The sending unit 1011 is configured to send an update message to the base station, so that the base station transparently transmits the update message to a mobility management entity, and the mobility management entity pages the terminal device according to the update message, where the update message includes an identifier of the second cell, the first threshold of the received signal communication parameter of the second cell, or the first limit value of the second cell.

The second setting unit 1010 is further configured to: if the communication parameter value is less than or equal to the first threshold, or the difference between the communication parameter value and the first threshold is less than or equal to the first limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least the hysteresis of the received signal communication parameter of the first cell and the offset of the received signal communication parameter of the second cell.

The sending unit 1011 is further configured to send an update message to the base station, so that the base station transparently transmits the update message to the mobility management entity, and the mobility management entity pages the terminal device according to the update message, where the update message includes the identifier of the second cell and the corresponding parameter of the second cell that is obtained according to the frequency priority of the second cell.

The corresponding parameter of the second cell includes at least one of the hysteresis of the received signal communication parameter of the first cell, the offset of the received signal communication parameter of the second cell, or the second limit value of the second cell.

In this way, when a received signal communication parameter value of a first cell that is obtained through measurement is less than or equal to a first threshold of the first cell, a second threshold is obtained, it is determined that the communication parameter value is greater than the second threshold, and after the first cell is set as a serving cell of the terminal device, a communication parameter value of a second cell is greater than a first threshold of the second cell, or a difference between the communication parameter value of the second cell and the first threshold is greater than a first limit value, so that the terminal device can reselect the second cell, and communication quality of the terminal device is improved in a case in which the terminal device communicates normally.

Embodiment 4

Figure 3:
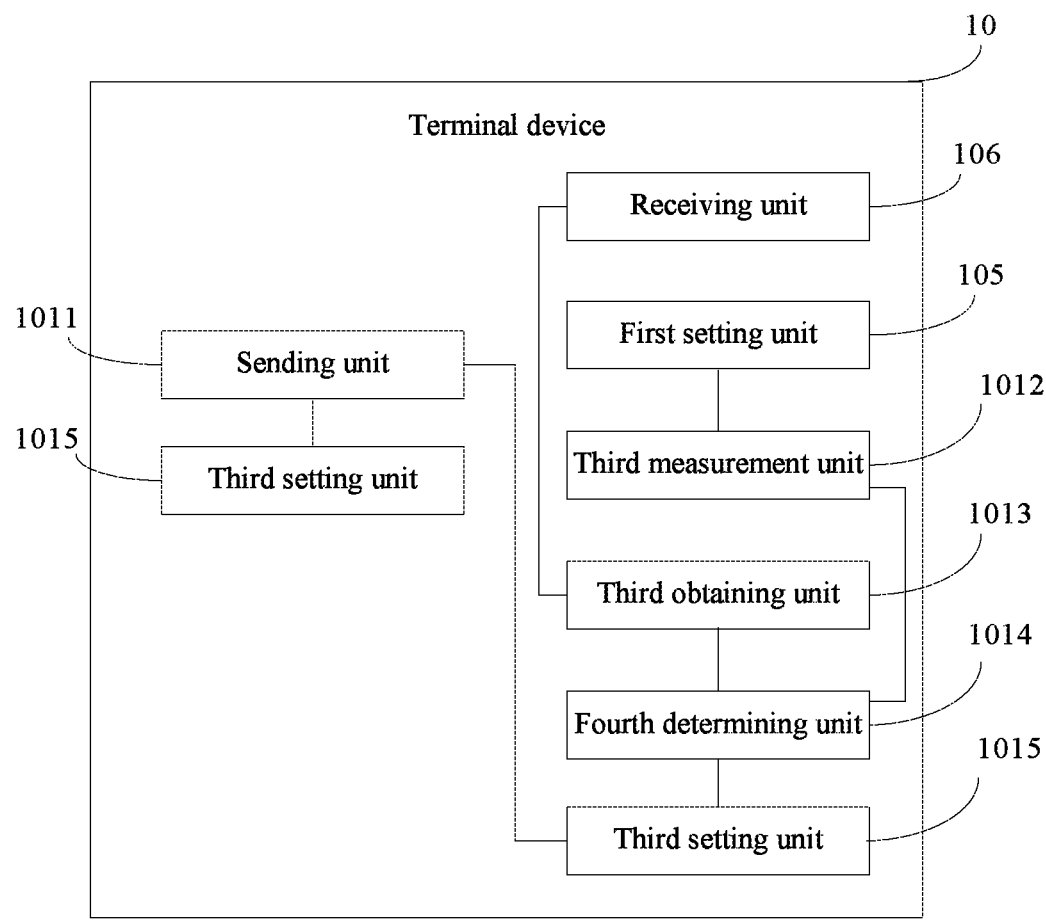
FIG. 3 is a schematic structural diagram of still another terminal device according to an embodiment of the present invention.

This embodiment of the present invention provides a terminal device 10. It is assumed that the terminal device reselects a second cell by means of coverage enhancement based on that the terminal device measures a received signal communication parameter value of a first cell, obtains a first threshold of the first cell, and determines that the received signal communication parameter value of the first cell is greater than the first threshold of the first cell, that is, selects the first cell as a serving cell by means of non-coverage enhancement, in Embodiment 2. As shown in FIG. 3, the terminal device includes: a receiving unit 106, a first setting unit 105, a sending unit 1011, a third measurement unit 1012, a third obtaining unit 1013, a fourth determining unit 1014, and a third setting unit 1015.

The receiving unit 106 is configured to receive a broadcast message sent by a base station to which the first cell belongs.

The broadcast message includes at least one of a second minimum threshold of a communication parameter, an offset of the second minimum threshold of the communication parameter, a hysteresis of the received signal communication parameter of the first cell, an offset of the received signal communication parameter of the second cell, a second limit value of the second cell, a frequency priority parameter of the first cell, a frequency priority parameter of the second cell, or a cell selection level parameter.

It should be noted that, the terminal device may repeatedly detect the broadcast message until the broadcast message is detected, and receive the broadcast message.

The first setting unit 105 is further configured to: if the received signal communication parameter value of the first cell is greater than the first threshold of the first cell, set the first cell as the serving cell of the terminal device.

The third measurement unit 1012 is configured to measure a received signal communication parameter value of the second cell.

The second cell is any neighboring cell of the first cell.

The third obtaining unit 1013 is configured to: when the received signal communication parameter value of the first cell is less than or equal to the first threshold of the first cell, obtain a second threshold of the second cell from the broadcast message, or when a difference between the received signal communication parameter value of the first cell and the first threshold of the first cell is less than or equal to a first limit value, obtain the second limit value of the second cell.

The second threshold includes at least a sum of a second minimum threshold of the received signal communication parameter of the second cell and an offset of a first minimum threshold of the received signal communication parameter of the second cell.

The fourth determining unit 1014 is configured to determine whether the received signal communication parameter value of the second cell is greater than the second threshold of the second cell, or whether a difference between the received signal communication parameter value of the second cell and the second threshold is greater than the second limit value.

The third setting unit 1015 is configured to: if the communication parameter value is greater than the second threshold, or the difference between the communication parameter value and the second threshold is greater than the second limit value, set the second cell as the serving cell of the terminal device.

When the terminal device obtains the second threshold of the second cell from the broadcast message, and determines that the communication parameter value of the second cell is greater than the second threshold, the terminal device sets the second cell as the serving cell of the terminal device. When the terminal device obtains the second limit value of the second cell from the broadcast message, and determines that the difference between the communication parameter value and the second threshold is greater than the second limit value, the terminal device sets the second cell as the serving cell of the terminal device.

Particularly, the third setting unit of the terminal device may also set the second cell as the serving cell of the terminal device according to that the difference between the communication parameter value of the second cell and the first threshold is greater than the second limit value.

The sending unit 1011 is further configured to send an update message to the base station, so that the base station transparently transmits the update message to a mobility management entity, and the mobility management entity pages the terminal device according to the update message, where the update message includes an identifier of the second cell, and the second threshold of the received signal communication parameter of the second cell or the second limit value of the second cell.

The third setting unit 1015 is further configured to: if the communication parameter value of the second cell is less than or equal to the second threshold, or the difference between the communication parameter value and the second threshold is less than or equal to the second limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least the hysteresis of the received signal communication parameter of the first cell and the offset of the received signal communication parameter of the second cell.

The sending unit 1011 is further configured to send an update message to the base station, so that the base station transparently transmits the update message to the mobility management entity, and the mobility management entity pages the terminal device according to the update message, where the update message includes the identifier of the second cell and the corresponding parameter of the second cell that is obtained according to the frequency priority of the second cell.

In this way, after a first cell is set as a serving cell of the terminal device when a received signal communication parameter value of the first cell that is obtained through measurement is greater than a first threshold of the first cell, if the received signal communication parameter value of the first cell is less than or equal to the first threshold of the first cell, a second threshold of a second cell is obtained from a broadcast message, and it is determined that a communication parameter value of the second cell is greater than the second threshold of the second cell, or a difference between the communication parameter value of the second cell and the second threshold is greater than a second limit value, so that the terminal device can reselect the second cell, and communication quality of the terminal device is improved in a case in which the terminal device communicates normally.

Embodiment 5

This embodiment of the present invention provides a terminal device. When the terminal device reselects a neighboring cell of a first cell, that is, a second cell that can provide a communications service to the terminal device, if a communication parameter value of the second cell is less than or equal to a first threshold of the second cell, the terminal device needs to obtain, from a broadcast message according to a value relationship between a carrier priority of the second cell and a carrier priority of the first cell, a corresponding parameter for selecting the second cell, and select different measurement starting rules, to determine to set the second cell as a serving cell of the terminal device, so that the terminal device communicates normally.

Generally, a cell carrier priority is configured in a base station, the base station notifies the terminal device of a cell carrier priority of the terminal device by sending the broadcast message, and the broadcast message carries the cell carrier priority. When the terminal device performs cell reselection, the cell carrier priority may be represented by cellReselectionPriority, the cell carrier priority ranges from 0 to 7, and a larger value of the cell carrier priority indicates a higher reselection priority of all cells on a corresponding carrier.

When the terminal device performs cell reselection, if a frequency priority of the first cell is equal to a frequency priority of the second cell, where the second cell is the neighboring cell of the first cell, the terminal device obtains $R_{s1}$ or $R_{n1}$, where $R_{s1}$ is a sum of a received signal strength value of the first cell and a second hysteresis of received signal strength of the first cell, and $R_{n1}$ is a difference between a received signal strength value of the second cell and a second offset of the received signal strength of the second cell. The terminal device determines whether $R_{s1}$ is less than $R_{n1}$, and if $R_{s1}$ is less than $R_{n1}$, sets the second cell as the serving cell of the terminal device.

Generally, a first hysteresis of a communication parameter of the first cell may be represented by $Q_{Hyst}$, a first offset of the communication parameter of the second cell may be represented by $Q_{offset}$, $R_s=Q_{meas,s}+Q_{Hyst}$, $R_n=Q_{meas,n}-Q_{offset}$, and when $R_n>R_s$, a criterion R is met, where $Q_{Hyst}$ and $Q_{offset}$ are used to prevent a ping-pong effect during cell reselection.

The second hysteresis of the received signal strength of the first cell may be represented by $Q_{Hyst\_ce}$, the second offset of the received signal strength of the second cell may be represented by $Q_{offset\_ce}$, $R_{s1}=Q_{meas,s}+Q_{Hyst\_ce}$, $R_{n1}=Q_{meas,n}-Q_{offset\_ce}$, and when $R_{n1}>R_{s1}$, the criterion R is met. The second hysteresis of the communication parameter is less than the first hysteresis of the communication parameter, and the second offset of the communication parameter is less than the first offset of the communication parameter.

When the terminal device performs cell reselection, if the frequency priority of the first cell is higher than the frequency priority of the second cell, where the second cell is the neighboring cell of the first cell, the terminal device determines whether a difference between a communication parameter value of the first cell and a second threshold of the first cell is less than a second limit value of the first cell, and whether a difference between the communication parameter value of the second cell and a second threshold of the second cell is greater than a second limit value of the second cell.

If the difference between the communication parameter value of the first cell and the second threshold of the first cell is less than the second limit value of the first cell, and the difference between the communication parameter value of the second cell and the second threshold of the second cell is greater than the second limit value of the second cell, the second cell is set as the serving cell of the terminal device.

When the terminal device performs cell reselection, if the frequency priority of the first cell is lower than the frequency priority of the second cell, where the second cell is the neighboring cell of the first cell, the terminal device determines whether a difference between the communication parameter value of the second cell and the second threshold of the second cell is greater than the second limit value of the second cell, and if the difference between the communication parameter value of the second cell and the second threshold of the second cell is greater than the second limit value of the second cell, sets the second cell as the serving cell of the terminal device.

Likewise, when the terminal device reselects the neighboring cell of the first cell, that is, the second cell that can provide the communications service to the terminal device, when the communication parameter value of the first cell is less than or equal to the first threshold of the second cell, and the communication parameter value of the second cell is less than or equal to the second threshold of the second cell, the terminal device needs to obtain, from the broadcast message according to the value relationship between the carrier priority of the second cell and the carrier priority of the first cell, a corresponding parameter for selecting the second cell, and select different measurement starting rules, to determine to set the second cell as the serving cell of the terminal device, so that the terminal device communicates normally.

When the terminal device performs cell reselection, if the frequency priority of the first cell is equal to the frequency priority of the second cell, where the second cell is the neighboring cell of the first cell, the terminal device obtains $R_{s1}$ or $R_{n1}$, where $R_{s1}$ is a sum of a received signal strength value of the first cell and the second hysteresis of the received signal strength of the first cell, and $R_{n1}$ is a difference between a received signal strength value of the second cell and the second onset of the received signal strength of the second cell. The terminal device determines whether $R_{s1}$ is less than $R_{n1}$, and if $R_{s1}$ is less than $R_{n1}$, sets the second cell as the serving cell of the terminal device.

Generally, the first hysteresis of the communication parameter of the first cell may be represented by $Q_{Hyst}$, the first offset of the communication parameter of the second cell may be represented by $Q_{offset}$, $R_s=Q_{meas,s}+Q_{Hyst}$, $R_n=Q_{meas,n}-Q_{offset}$, and when $R_n>R_s$, the criterion R is met, where $Q_{Hyst}$ and $Q_{offset}$ are used to prevent a ping-pong effect during cell reselection.

The second hysteresis of the received signal strength of the first cell may be represented by $Q_{Hyst\_ce}$, the second offset of the received signal strength of the second cell may be represented by $Q_{offset\_ce}$, $R_{s1}=Q_{meas,s}+Q_{Hyst\_ce}$, $R_{n1}=Q_{meas,n}-Q_{offset\_ce}$, and when $R_{n1}>R_{s1}$, the criterion R is met. The second hysteresis of the communication parameter is less than the first hysteresis of the communication parameter, and the second offset of the communication parameter is less than the first offset of the communication parameter.

When the terminal device performs cell reselection, if the frequency priority of the first cell is higher than the frequency priority of the second cell, where the second cell is the neighboring cell of the first cell, the terminal device determines whether the difference between the communication parameter value of the first cell and the second threshold of the first cell is less than the second limit value of the first cell, and whether the difference between the communication parameter value of the second cell and the second threshold of the second cell is greater than the second limit value of the second cell.

If the difference between the communication parameter value of the first cell and the second threshold of the first cell is less than the second limit value of the first cell, and the difference between the communication parameter value of the second cell and the second threshold of the second cell is greater than the second limit value of the second cell, the second cell is set as the serving cell of the terminal device.

When the terminal device performs cell reselection, if the frequency priority of the first cell is lower than the frequency priority of the second cell, where the second cell is the neighboring cell of the first cell, the terminal device determines whether the difference between the communication parameter value of the second cell and the second threshold of the second cell is greater than the second limit value of the second cell, and if the difference between the communication parameter value of the second cell and the second threshold of the second cell is greater than the second limit value of the second cell, sets the second cell as the serving cell of the terminal device.

Exemplarily, after the terminal device selects the first cell by means of coverage enhancement, and sets the first cell as the serving cell of the terminal device, if the terminal device moves from a place having a relatively weak received signal to a place having a relatively strong received signal, and the second cell has a relatively strong received signal, the terminal device reselects the second cell by means of non-coverage enhancement. However, when the terminal device moves from the place having a relatively strong received signal back to the place having a relatively weak received signal, in this case, the second cell also has a relatively weak received signal, and a received signal communication parameter value obtained by the terminal device through measurement cannot meet a criterion S. The terminal device performs cell reselection by determining the frequency priority of the first cell and the frequency priority of the second cell.

After the terminal device selects the first cell by means of non-coverage enhancement, and sets the first cell as the serving cell of the terminal device, if the terminal device moves from a place having a relatively strong received signal to a place having a relatively weak received signal, and the second cell has a relatively weak received signal, the terminal device reselects the second cell by means of coverage enhancement. In this case, for the terminal device, the frequency priority of the first cell may be lower than the frequency priority of the second cell. Moreover, the terminal device may also perform cell reselection by determining the frequency priority of the first cell and the frequency priority of the second cell.

In this way, after the terminal device selects a second cell by means of non-coverage enhancement, and sets the second cell as a serving cell of the terminal device, when a communication parameter value of the second cell is less than or equal to a first threshold of the second cell, or after the terminal device selects a second cell by means of coverage enhancement, and sets the second cell as a serving cell of the terminal device, when a communication parameter value of a first cell is less than or equal to a first threshold of the second cell, or a communication parameter value of the second cell is less than or equal to a second threshold of the second cell, the terminal device may obtain, from a broadcast message according to a value relationship between a carrier priority of the second cell and a carrier priority of the first cell, a corresponding parameter for selecting the second cell, and select different measurement starting rules, to determine to set the second cell as the serving cell of the terminal device, so that the terminal device communicates normally.

Embodiment 6

Figure 4:
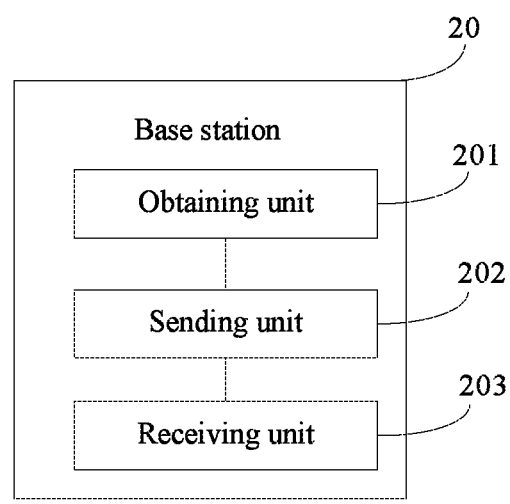
FIG. 4 is a schematic structural diagram of a base station according to an embodiment of the present invention.

This embodiment of the present invention provides a base station 20. As shown in FIG. 4, the base station includes:

an obtaining unit 201, configured to obtain a broadcast message, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and a sending unit 202, configured to send the broadcast message to a terminal device, so that the terminal device selects a cell according to the broadcast message.

The obtaining unit 201 is specifically configured to:

obtain the cell information locally or from a request message, a response message, or an update message sent by a second base station to the first base station.

The sending unit 202 is further configured to:

repeatedly send the broadcast message to the terminal device, so that the terminal device selects a cell according to the broadcast message.

The base station 20 further includes:

a receiving unit 203, configured to receive an update message sent by the terminal device, where the update message includes at least one of an identifier of the second cell, the hysteresis of the received signal communication parameter of the first cell, the offset of the received signal communication parameter of the second cell, or the second limit value, so as to transparently transmit the update message to a mobility management entity, so that the mobility management entity pages the terminal device according to the update message.

In this way, the base station obtains a broadcast message; sends the broadcast message to a terminal device, so that the terminal device selects a cell according to the broadcast message, and the terminal device can communicate normally, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and receives an update message sent by the terminal device, so as to transparently transmit the update message to a mobility management entity, so that the mobility management entity pages the terminal device according to the update message.

Embodiment 7

Figure 5:
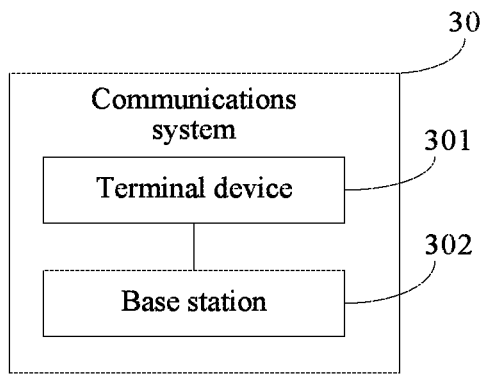
FIG. 5 is a schematic diagram of a communications system according to an embodiment of the present invention.

This embodiment of the present invention provides a communications system 30. As shown in FIG. 5, the communications system includes:

a terminal device 301 and a base station 302.

It is assumed that the terminal device 301 performs initial cell selection by means of coverage enhancement. The terminal device 301 is configured to: measure a received signal communication parameter value of a first cell, where the first cell is a cell that can provide a communications service to the terminal device; determine whether the communication parameter value is greater than a first threshold of the first cell, where the first threshold includes at least a sum of a first minimum threshold of a received signal communication parameter of the first cell and an offset of the first minimum threshold of the received signal communication parameter of the first cell; if the communication parameter value is less than or equal to the first threshold, obtain a second threshold from a broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell; determine whether the communication parameter value is greater than the second threshold; and if the communication parameter value is greater than the second threshold, set the first cell as a serving cell of the terminal device.

It is assumed that the terminal device 301 performs initial cell selection by means of coverage enhancement, and reselects a second cell by means of non-coverage enhancement. The terminal device 301 is configured to: after setting the first cell as the serving cell of the terminal device, measure a received signal communication parameter value of the second cell, where the second cell is any neighboring cell of the first cell; obtain a first threshold of the second cell or a first limit value of the second cell from the broadcast message, where the first threshold includes at least a sum of a first minimum threshold of the received signal communication parameter of the second cell and an offset of the first minimum threshold of the received signal communication parameter of the second cell; determine whether the communication parameter value is greater than the first threshold, or whether a difference between the communication parameter value and the first threshold is greater than the first limit value; if the communication parameter value is greater than the first threshold, or the difference between the communication parameter value and the first threshold is greater than the first limit value, set the second cell as the serving cell of the terminal device; and if the communication parameter value is less than or equal to the first threshold, or the difference between the communication parameter value and the first threshold is less than or equal to the first limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

It is assumed that the terminal device 301 reselects a second cell by means of coverage enhancement based on that the terminal device 301 measures a received signal communication parameter value of a first cell, obtains a first threshold of the first cell, and determines that the received signal communication parameter value of the first cell is greater than the first threshold of the first cell, that is, selects the first cell as a serving cell by means of non-coverage enhancement. After it is determined whether 1 communication parameter value is greater than the first threshold of the first cell, the terminal device 301 is configured to:

if the received signal communication parameter value of the first cell is greater than the first threshold of the first cell, set the first cell as the serving cell of the terminal device;

measure a received signal communication parameter value of the second cell, where the second cell is any neighboring cell of the first cell; and when the received signal communication parameter value of the first cell is less than or equal to the first threshold of the first cell, obtain a second threshold of the second cell from the broadcast message, where the second threshold includes at least a sum of a second minimum threshold of the received signal communication parameter of the second cell and an offset of a first minimum threshold of the received signal communication parameter of the second cell, or when a difference between the received signal communication parameter value of the first cell and the first threshold of the first cell is less than or equal to a first limit value, obtain a second limit value of the second cell;

determine whether the received signal communication parameter value of the second cell is greater than the second threshold of the second cell, or whether a difference between the received signal communication parameter value of the second cell and the second threshold is greater than the second limit value;

if the communication parameter value is greater than the second threshold, or the difference between the communication parameter value and the second threshold is greater than the second limit value, set the second cell as the serving cell of the terminal device; and if the communication parameter value of the second cell is less than or equal to the second threshold, or the difference between the communication parameter value and the second threshold is less than or equal to the second limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

It should be noted that, before measuring the received signal communication parameter value of the first cell or measuring the received signal communication parameter value of the second cell, the terminal device first needs to receive the broadcast message sent by the base station to which the first cell belongs, where the broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, a frequency priority parameter of the first cell, a frequency priority parameter of the second cell, or a cell selection level parameter.

Particularly, the terminal device may repeatedly detect the broadcast message until the broadcast message is detected, and receive the broadcast message.

Further, after setting the second cell as the serving cell of the terminal device, the terminal device needs to send an update message to the base station, so that the base station transparently transmits the update message to a mobility management entity, and the mobility management entity pages the terminal device according to the update message, where the update message includes at least one of an identifier of the second cell, the hysteresis of the received signal communication parameter, the offset of the received signal communication parameter, or the second limit value.

The communication parameter is received signal strength or received signal quality;

when the communication parameter is received signal strength, the first threshold is $A+A1+C$, where A is a minimum threshold of a received signal strength value, $A1$ is an offset of the minimum threshold of the received signal strength value, and C is a compensation; and when the communication parameter is received signal quality, the first threshold is $B+B1$, where B is a minimum threshold of a received signal quality value, and $B1$ is an offset of the minimum threshold of the received signal quality value.

The base station 302 is configured to obtain the broadcast message, where the broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, the frequency priority parameter of the first cell, the frequency priority parameter of the second cell, or the cell selection level parameter, and the second cell is a neighboring cell of the first cell; and send the broadcast message to the terminal device, so that the terminal device selects a cell according to the broadcast message.

Particularly, the base station may obtain the broadcast message locally or from a request message, a response message, or an update message sent by a second base station to the first base station.

The base station may repeatedly send the broadcast message to the terminal device, so that the terminal device selects a cell according to the broadcast message.

Further, after sending the broadcast message to the terminal device, the base station 302 receives the update message sent by the terminal device, where the update message includes at least one of the identifier of the second cell, the hysteresis of the received signal communication parameter of the first cell, the offset of the received signal communication parameter of the second cell, or the second limit value, so as to transparently transmit the update message to the mobility management entity, so that the mobility management entity pages the terminal device according to the update message.

Embodiment 8

Figure 6:
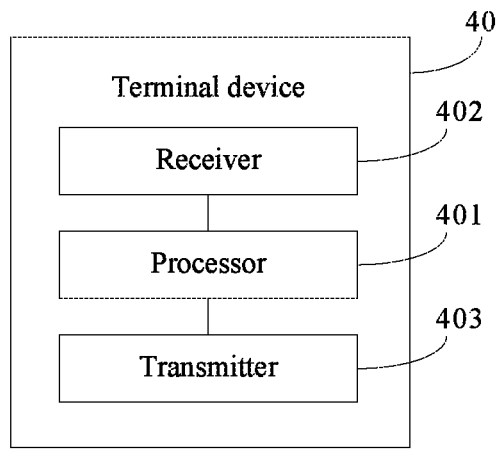
FIG. 6 is a schematic structural diagram of yet another terminal device according to an embodiment of the present invention.

This embodiment of the present invention provides a terminal device 40. As shown in FIG. 6, the terminal device includes:

a processor 401, configured to measure a received signal communication parameter value of a first cell, where the first cell is a cell that can provide a communications service to the terminal device.

The communication parameter is received signal strength or received signal quality;

when the communication parameter is received signal strength, the first threshold is $A+A1+C$, where A is a minimum threshold of a received signal strength value, $A1$ is an offset of the minimum threshold of the received signal strength value, and C is a compensation; and when the communication parameter is received signal quality, the first threshold is $B+B1$, where B is a minimum threshold of a received signal quality value, and $B1$ is an offset of the minimum threshold of the received signal quality value.

The processor 401 is further configured to determine whether the communication parameter value is greater than a first threshold of the first cell.

The first threshold includes at least a sum of a first minimum threshold of a received signal communication parameter of the first cell and an offset of the first minimum threshold of the received signal communication parameter of the first cell. The first minimum threshold of the received signal communication parameter of the first cell and the offset of the first minimum threshold of the received signal communication parameter of the first cell may be obtained locally or from a broadcast message sent by a base station to which the first cell belongs.

The processor 401 is further configured to: if the communication parameter value is less than or equal to the first threshold, obtain a second threshold from the broadcast message.

The second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell.

The processor 401 is further configured to determine whether the communication parameter value is greater than the second threshold.

The processor 401 is further configured to: if the communication parameter value is greater than the second threshold, set the first cell as a serving cell of the terminal device.

In this way, when a received signal communication parameter value of a first cell that is obtained through measurement is less than or equal to a first threshold of the first cell, a second threshold is obtained, it is determined that the communication parameter value is greater than the second threshold, and the first cell is set as a serving cell of the terminal device, so that when the terminal device is in an idle state, a received signal communication parameter value obtained through measurement meets a cell selection requirement, and the terminal device can communicate normally.

The processor 401 is further configured to measure a received signal communication parameter value of a second cell, where the second cell is any neighboring cell of the first cell.

The processor 401 is further configured to: obtain a first threshold of the second cell or a first limit value of the second cell from the broadcast message.

The first threshold includes at least a sum of a first minimum threshold of the received signal communication parameter of the second cell and an offset of the first minimum threshold of the received signal communication parameter of the second cell.

The processor 401 is further configured to determine whether the communication parameter value is greater than the first threshold, or whether a difference between the communication parameter value and the first threshold is greater than the first limit value.

The processor 401 is further configured to: if the communication parameter value is greater than the first threshold, or the difference between the communication parameter value and the first threshold is greater than the first limit value, set the second cell as the serving cell of the terminal device.

The processor 401 is further configured to: if the communication parameter value is less than or equal to the first threshold, or the difference between the communication parameter value and the first threshold is less than or equal to the first limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

In this way, when a received signal communication parameter value of a first cell that is obtained through measurement is less than or equal to a first threshold of the first cell, a second threshold is obtained, it is determined that the communication parameter value is greater than the second threshold, and after the first cell is set as a serving cell of the terminal device, a communication parameter value of a second cell is greater than a first threshold of the second cell, or a difference between the communication parameter value of the second cell and the first threshold is greater than a first limit value, so that the terminal device can reselect the second cell, and communication quality of the terminal device is improved in a case in which the terminal device communicates normally.

Exemplarily, it is assumed that the communication parameter is the received signal strength. Generally, the received signal strength value of the first cell that is obtained through measurement may be represented by $Q_{rxlevmeas}$, a first minimum threshold of the received signal strength of the first cell may be represented by $Q_{rxlevmin}$, an offset of the first minimum threshold of the received signal strength of the first cell may be represented by $Q_{rxlevminoffset}$, a compensation may be represented by $P_{compensation}$, and the first threshold may be represented by $(Q_{rxlevmin}+Q_{rxlevminoffset})+P_{compensation}$. When the received signal strength value of the first cell obtained through measurement is less than or equal to the first threshold, that is, $Q_{rxlevmeas} \leq (Q_{rxlevmin}+Q_{rxlevminoffset})+P_{compensation}$, the second threshold of the first cell is obtained.

A second minimum threshold of the received signal strength of the first cell may be represented by $Q_{rxlevmin\_ce}$, an offset of the second minimum threshold of the received signal strength of the first cell may be represented by $Q_{rxlevminoffset\_ce}$, and the second threshold may be represented by $(Q_{rxlevmin}+Q_{rxlevminoffset\_ce})+P_{compensation}$ or $(Q_{rxlevmin\_ce}+Q_{rxlevminoffset})+P_{compensation}$. When the received signal strength value obtained through measurement is greater than the second threshold, that is, $Q_{rxlevmeas} > (Q_{rxlevmin}+Q_{rxlevminoffset\_ce})+P_{compensation}$ or $Q_{rxlevmeas} > (Q_{rxlevmin\_ce}+Q_{rxlevminoffset})+P_{compensation}$, the first cell is set as the serving cell of the terminal device.

$P_{compensation}=\text{Max}(P_{EMax}-P_{UMax},0)$, where $P_{EMax}$ is maximum uplink transmit power allowed for the terminal device in the first cell, and is obtained from the broadcast message, $P_{UMax}$ is a maximum uplink transmit power determined by a capability of the terminal device, $P_{compensation}=\text{Max}(P_{EMax}-P_{UMax}, 0)$ instructs to obtain a maximum value from 0 and a difference between the maximum uplink transmit power allowed for the terminal device in the first cell and the maximum uplink transmit power determined by the capability of the terminal device, and $P_{compensation}$ is a value greater than or equal to 0. When $P_{EMax}$ is greater than $P_{UMax}$, and $P_{compensation}$ is greater than 0, an access range of the terminal device at a cell edge is reduced, to avoid problems such as service drop and access failure caused due to insufficient transmit power of the terminal device. When $P_{EMax}$ is less than $P_{UMax}$, and $P_{compensation}$ is equal to 0, the terminal device may camp on the cell according to the maximum uplink transmit power and access a network. $Q_{rxlevminoffset}$ is used as a compensation value of $Q_{rxlevmin}$ only when the terminal device periodically searches for a high-priority PLMN (Public Land Mobile Network, public land mobile network). $Q_{rxlevmeas}$ is an actual value of RSRP (Reference Signal Receiving Power, reference signal received power) of the first cell that is obtained by the terminal device through measurement. During actual application, $Q_{rxlevmin}$ is an integer, and may be any negative integer from −70 to −22, and $Q_{rxlevminoffset}$ is also an integer, and may be any integer from 1 to 8.

It is assumed that the received signal strength value $Q_{rxlevmeas}$ of the first cell that is obtained through measurement is −45, the first minimum threshold $Q_{rxlevmin}$ of the received signal strength of the first cell is −50, the offset $Q_{rxlevminoffset}$ of the first minimum threshold of the received signal strength of the first cell is 7, and the compensation $P_{compensation}$ is 0. Then the first threshold is −50+7+0. It is determined whether the received signal strength value of the first cell that is obtained through measurement is greater than the first threshold of the first cell, and the received signal strength value obtained through measurement is less than the first threshold, that is, −45<−50+7+0. Then the terminal device obtains the second threshold of the first cell from the broadcast message, and determines whether the received signal strength value of the first cell that is obtained through measurement is greater than the second threshold of the first cell.

It is assumed that the second minimum threshold $Q_{rxlevmin\_ce}$ of the received signal strength of the first cell that is included in the broadcast message is −55, the received signal strength value $Q_{rxlevmeas}$ of the first cell that is obtained through measurement is −45, the offset $Q_{rxlevminoffset}$ of the first minimum threshold of the received signal strength of the first cell is 7, and the compensation $P_{compensation}$ is 0. Then the second threshold is −55+7+0. It is determined whether the received signal strength value of the first cell that is obtained through measurement is greater than the second threshold of the first cell, and the received signal strength value of the first cell that is obtained through measurement is greater than the second threshold of the first cell, that is, −45>−55+7+0. Then the first cell is set as the serving cell of the terminal device.

Alternatively, it is assumed that the offset $Q_{rxlevminoffset\_ce}$ of the second minimum threshold of the received signal strength of the first cell that is included in the broadcast message is 2, the received signal strength value $Q_{rxlevmeas}$ of the first cell that is obtained through measurement is −45, the first minimum threshold $Q_{rxlevmin}$ of the received signal strength of the first cell is −50, and the compensation $P_{compensation}$ is 0. Then the second threshold is −50+2+0. It is determined whether the received signal strength value of the first cell that is obtained through measurement is greater than the second threshold of the first cell, and the received signal strength value of the first cell that is obtained through measurement is greater than the second threshold of the first cell, that is, −45>−50+2+0. Then the first cell is set as the serving cell of the terminal device.

Particularly, the terminal device may further obtain a common offset from the broadcast message, where the common offset may be represented by $Q_{offset}$, and the common offset $Q_{offset}$ is enumerated, and may be any one of −24, −22, −20, −18, −16, −14, −12, −10, −8, −6, −5, −4, −3, −2, −1, 0, 1, 2, 3, 4, 5, 6, 8, 10, 12, 14, 16, 18, 20, 22, and 24. When the received signal strength value of the first cell that is obtained through measurement is less than or equal to the first threshold of the first cell, the first threshold of the first cell is reduced by using the common offset, so as to obtain the second threshold of the first cell, so that the received signal strength value of the first cell that is obtained through measurement is greater than the second threshold of the first cell, and the first cell is set as the serving cell of the terminal device.

Exemplarily, it is assumed that the received signal strength value $Q_{rxlevmeas}$ of the first cell that is obtained through measurement is −45, the first minimum threshold $Q_{rxlevmin}$ of the received signal strength of the first cell is −50, the offset $Q^{rxlevminoffset}$ of the first minimum threshold of the received signal strength of the first cell is 7, the compensation $P^{compensation}$ is 0, and the common offset $Q_{offset}$ is 3. Then the first threshold is −50−3+7+0. It is determined whether the received signal strength value of the first cell that is obtained through measurement is greater than the second threshold of the first cell, and the received signal strength value obtained through measurement is greater than the second threshold of the first cell, that is, 45>−50−3+7+0. Then the first cell is set as the serving cell of the terminal device.

It should be noted that, when the terminal device performs cell selection for the first time, the terminal device may also directly obtain, locally or from the broadcast message, the second minimum threshold of the received signal strength of the first cell or the offset of the second minimum threshold of the received signal strength, to obtain the second threshold of the first cell, determine whether the received signal strength value of the first cell that is obtained through measurement is greater than the second threshold of the first cell, and if the received signal strength value of the first cell that is obtained through measurement is greater than the second threshold of the first cell, set the first cell as the serving cell of the terminal device. In this way, the terminal device may quickly select a suitable cell for the terminal device to camp on, a cell selection time of the terminal device is reduced, and the terminal device communicates normally.

The processor 401 is further configured to: if the received signal communication parameter value of the first cell is greater than the first threshold of the first cell, set the first cell as the serving cell of the terminal device.

The processor 401 is further configured to measure a received signal communication parameter value of a second cell, where the second cell is any neighboring cell of the first cell.

The processor 401 is further configured to: when the received signal communication parameter value of the first cell is less than or equal to the first threshold of the first cell, obtain a second threshold of the second cell from the broadcast message, where the second threshold includes at least a sum of a second minimum threshold of the received signal communication parameter of the second cell and an offset of a first minimum threshold of the received signal communication parameter of the second cell, or when a difference between the received signal communication parameter value of the first cell and the first threshold of the first cell is less than or equal to a first limit value, obtain a second limit value of the second cell;

The processor 401 is further configured to determine whether the received signal communication parameter value of the second cell is greater than the second threshold of the second cell, or whether a difference between the received signal communication parameter value of the second cell and the second threshold is greater than the second limit value.

The processor 401 is further configured to: if the communication parameter value is greater than the second threshold, or the difference between the communication parameter value and the second threshold is greater than the second limit value, set the second cell as the serving cell of the terminal device.

The processor 401 is further configured to: if the communication parameter value of the second cell is less than or equal to the second threshold, or the difference between the communication parameter value and the second threshold is less than or equal to the second limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

In this way, after a first cell is set as a serving cell of the terminal device when a received signal communication parameter value of the first cell that is obtained through measurement is greater than a first threshold of the first cell, if the received signal communication parameter value of the first cell is less than or equal to the first threshold of the first cell, a second threshold of a second cell is obtained from a broadcast message, it is determined that a communication parameter value of the second cell is greater than the second threshold of the second cell, or a difference between the communication parameter value of the second cell and the second threshold is greater than a second limit value, so that the terminal device can reselect the second cell, and communication quality of the terminal device is improved in a case in which the terminal device communicates normally.

The terminal device 40 further includes:

a receiver 402, configured to receive the broadcast message sent by the base station to which the first cell belongs.

The broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, a frequency priority parameter of the first cell, a frequency priority parameter of the second cell, or a cell selection level parameter.

The receiver 402 is further configured to:

repeatedly detect the second broadcast message until the broadcast message is detected, and receive the second broadcast message.

The terminal device 40 further includes:

a transmitter 403, configured to send an update message to the base station, so that the base station transparently transmits the update message to a mobility management entity, and the mobility management entity pages the terminal device according to the update message.

The update message includes at least one of an identifier of the second cell, the hysteresis of the received signal communication parameter of the second cell, the offset of the received signal communication parameter of the second cell, or the second limit value of the second cell.

Embodiment 9

This embodiment of the present invention provides a terminal device. When the terminal device reselects a neighboring cell of a first cell, that is, a second cell that can provide a communications service to the terminal device, if a communication parameter value of the second cell is less than or equal to a first threshold of the second cell, the terminal device needs to obtain, from a broadcast message according to a value relationship between a carrier priority of the second cell and a carrier priority of the first cell, a corresponding parameter for selecting the second cell, and select different measurement starting rules, to determine to set the second cell as a serving cell of the terminal device, so that the terminal device communicates normally.

Generally, a cell carrier priority is configured in a base station, the base station notifies the terminal device of a cell carrier priority of the terminal device by sending the broadcast message, and the broadcast message carries the cell carrier priority. When the terminal device performs cell reselection, the cell carrier priority may be represented by cellReselectionPriority, the cell carrier priority ranges from 0 to 7, and a larger value of the cell carrier priority indicates a higher reselection priority of all cells on a corresponding carrier.

When the terminal device performs cell reselection, if a frequency priority of the first cell is equal to a frequency priority of the second cell, where the second cell is the neighboring cell of the first cell, the terminal device obtains $R_{s1}$ or $R_{n1}$, where $R_{s1}$ is a sum of a received signal strength value of the first cell and a second hysteresis of the received signal strength of the first cell, and $R_{n1}$ is a difference between a received signal strength value of the second cell and a second offset of the received signal strength of the second cell. The terminal device determines whether $R_{s1}$ is less than $R_{n1}$, and if $R_{s1}$ is less than $R_{n1}$, sets the second cell as the serving cell of the terminal device.

Generally, a first hysteresis of a communication parameter of the first cell may be represented by $Q_{Hyst}$, a first offset of the communication parameter of the second cell may be represented by $Q_{offset}$, $R_s = Q_{meas,s} + Q_{Hyst}$, $R_n = Q_{meas,n} - Q_{offset}$, and when $R_n > R_s$, a criterion R is met, where $Q_{Hyst}$ and $Q_{offset}$ are used to prevent ping-pong effect during cell reselection.

The second hysteresis of the received signal strength of the first cell may be represented by $Q_{Hyst\_ce}$, the second offset of the received signal strength of the second cell may be represented by $Q_{offset\_ce}$, $R_{s1} = Q_{meas,s} + Q_{Hyst\_ce}$, $R_{n1} = Q_{meas,n} - Q_{offset\_ce}$, and when $R_{n1} > R_{s1}$, the criterion R is met. The second hysteresis of the communication parameter is less than the first hysteresis of the communication parameter, and the second offset of the communication parameter is less than the first offset of the communication parameter.

When the terminal device performs cell reselection, if the frequency priority of the first cell is higher than the frequency priority of the second cell, where the second cell is the neighboring cell of the first cell, the terminal device determines whether a difference between a communication parameter value of the first cell and a second threshold of the first cell is less than a second limit value of the first cell, and whether a difference between the communication parameter value of the second cell and a second threshold of the second cell is greater than a second limit value of the second cell.

If the difference between the communication parameter value of the first cell and the second threshold of the first cell is less than the second limit value of the first cell, and the difference between the communication parameter value of the second cell and the second threshold of the second cell is greater than the second limit value of the second cell, the second cell is set as the serving cell of the terminal device.

When the terminal device performs cell reselection, if the frequency priority of the first cell is lower than the frequency priority of the second cell, where the second cell is the neighboring cell of the first cell, the terminal device determines whether a difference between the communication parameter value of the second cell and the second threshold of the second cell is greater than the second limit value of the second cell, and if the difference between the communication parameter value of the second cell and the second threshold of the second cell is greater than the second limit value of the second cell, sets the second cell as the serving cell of the terminal device.

Likewise, when the terminal device reselects the neighboring cell of the first cell, that is, the second cell that can provide the communications service to the terminal device, when the communication parameter value of the first cell is less than or equal to the first threshold of the second cell, and the communication parameter value of the second cell is less than or equal to the second threshold of the second cell, the terminal device needs to obtain, from the broadcast message according to the value relationship between the carrier priority of the second cell and the carrier priority of the first cell, a corresponding parameter for selecting the second cell, and select different measurement starting rules, to determine to set the second cell as the serving cell of the terminal device, so that the terminal device communicates normally.

When the terminal device performs cell reselection, if the frequency priority of the first cell is equal to the frequency priority of the second cell, where the second cell is the neighboring cell of the first cell, the terminal device obtains $R_{s1}$ or $R_{n1}$, where $R_{s1}$ is a sum of a received signal strength value of the first cell and the second hysteresis of the received signal strength of the first cell, and $R_{n1}$ is a difference between a received signal strength value of the second cell and the second offset of the received signal strength of the second cell. The terminal device determines whether $R_{s1}$ is less than $R_{n1}$, and if $R_{s1}$ is less than $R_{n1}$, sets the second cell as the serving cell of the terminal device.

Generally, the first hysteresis of the communication parameter of the first cell may be represented by $Q_{Hyst}$, the first offset of the communication parameter of the second cell may be represented by $Q_{offset}$, $R_s=Q_{meas,s}+Q_{Hyst}$, $R_n=Q_{meas,n}-Q_{offset}$, and when $R_n>R_s$, the criterion R is met, where $Q_{Hyst}$ and $Q_{offset}$ are used to prevent a ping-pong effect during cell reselection.

The second hysteresis of the received signal strength of the first cell may be represented by $Q_{Hyst\_ce}$, the second offset of the received signal strength of the second cell may be represented by $Q_{offset\_ce}$, $R_{s1}=Q_{meas,s}+Q_{Hyst\_ce}$, $R_{n1}=Q_{meas,n}-Q_{offset\_ce}$, and when $R_{n1}>R_{s1}$, the criterion R is met. The second hysteresis of the communication parameter is less than the first hysteresis of the communication parameter, and the second offset of the communication parameter is less than the first offset of the communication parameter.

When the terminal device performs cell reselection, if the frequency priority of the first cell is higher than the frequency priority of the second cell, where the second cell is the neighboring cell of the first cell, the terminal device determines whether the difference between the communication parameter value of the first cell and the second threshold of the first cell is less than the second limit value of the first cell, and whether the difference between the communication parameter value of the second cell and the second threshold of the second cell is greater than the second limit value of the second cell.

If the difference between the communication parameter value of the first cell and the second threshold of the first cell is less than the second limit value of the first cell, and the difference between the communication parameter value of the second cell and the second threshold of the second cell is greater than the second limit value of the second cell, the second cell is set as the serving cell of the terminal device.

When the terminal device performs cell reselection, if the frequency priority of the first cell is lower than the frequency priority of the second cell, where the second cell is the neighboring cell of the first cell, the terminal device determines whether the difference between the communication parameter value of the second cell and the second threshold of the second cell is greater than the second limit value of the second cell, and if the difference between the communication parameter valve of the second cell and the second threshold of the second cell is greater than the second limit value of the second cell, sets the second cell as the serving cell of the terminal device.

Exemplarily, after the terminal device selects the first cell by means of coverage enhancement, and sets the first cell as the serving cell of the terminal device, if the terminal device moves from a place having a relatively weak received signal to a place having a relatively strong received signal, and the second cell has a relatively strong received signal, the terminal device reselects the second cell by means of non-coverage enhancement. However, when the terminal device moves from the place having a relatively strong received signal back to the place having a relatively weak received signal, in this case, the second cell also has a relatively weak received signal, and a received signal communication parameter value Obtained by the terminal device through measurement cannot meet a criterion S. The terminal device performs cell reselection by determining the frequency priority of the first cell and the frequency priority of the second cell.

After the terminal device selects the first cell by means of non-coverage enhancement, and sets the first cell as the serving cell of the terminal device, if the terminal device moves from a place having a relatively strong received signal to a place having a relatively weak received signal, and the second cell has a relatively weak received signal, the terminal device reselects the second cell by means of coverage enhancement. In this case, for the terminal device, the frequency priority of the first cell may be lower than the frequency priority of the second cell. Moreover, the terminal device may also perform cell reselection by determining the frequency priority of the first cell and the frequency priority of the second cell.

In this way, after the terminal device selects a second cell by means of non-coverage enhancement, and sets the second cell as a serving cell of the terminal device, when a communication parameter value of the second cell is less than or equal to a first threshold of the second cell, or after the terminal device selects a second cell by means of coverage enhancement, and sets the second cell as a serving cell of the terminal device, when a communication parameter value of a first cell is less than or equal to a first threshold of the second cell, or a communication parameter value of the second cell is less than or equal to a second threshold of the second cell, the terminal device may obtain, from a broadcast message according to a value relationship between a carrier priority of the second cell and a carrier priority of the first cell, a corresponding parameter for selecting the second cell, and select different measurement starting rules, to determine to set the second cell as the serving cell of the terminal device, so that the terminal device communicates normally.

Embodiment 9

Figure 7:
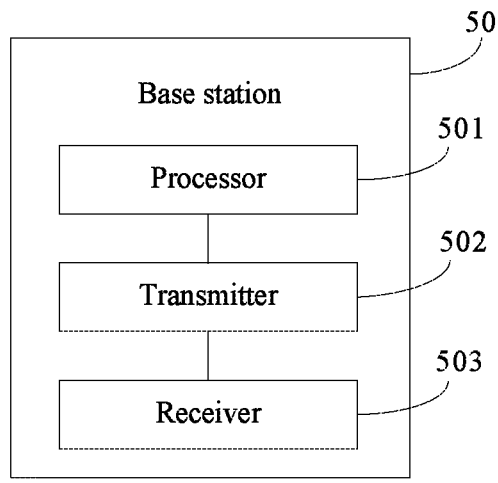
FIG. 7 is a schematic structural diagram of another base station according to an embodiment of the present invention.

This embodiment of the present invention provides a base station 50. As shown in FIG. 7, the base station includes:

a processor 501, configured to obtain a broadcast message, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and a transmitter 502, configured to send the broadcast message to a terminal device, so that the terminal device selects a cell according to the broadcast message.

The processor 501 is specifically configured to:

obtain the cell information locally or from a request message, a response message, or an update message sent by a second base station to the first base station.

The processor 501 is further configured to:

repeatedly send the broadcast message to the terminal device, so that the terminal device selects a cell according to the broadcast message.

The base station 50 further includes:

a receiver 503, configured to receive an update message sent by the terminal device, where the update message includes at least one of an identifier of the second cell, the hysteresis of the received signal communication parameter of the first cell, the offset of the received signal communication parameter of the second cell, or the second limit value, so as to transparently transmit the update message to a mobility management entity, so that the mobility management entity pages the terminal device according to the update message.

In this way, the base station obtains a broadcast message; sends the broadcast message to a terminal device, so that the terminal device selects a cell according to the broadcast message, and the terminal device can communicate normally, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and receives an update message sent by the terminal device, so as to transparently transmit the update message to a mobility management entity, so that the mobility management entity pages the terminal device according to the update message.

Embodiment 10

Figure 8:
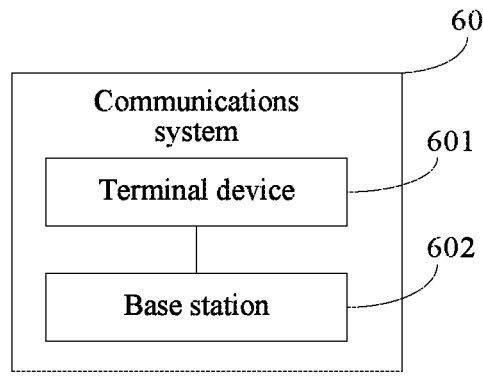
FIG. 8 is a schematic diagram of another communications system according to an embodiment of the present invention.

This embodiment of the present invention provides a communications system 60. As shown in FIG. 8, the communications system includes:

a terminal device 601 and a base station 602.

It is assumed that the terminal device 601 performs initial cell selection by means of coverage enhancement. The terminal device 601 is configured to: measure a received signal communication parameter value of a first cell, where the first cell is a cell that can provide a communications service to the terminal device; determine whether the communication parameter value is greater than a first threshold of the first cell, where the first threshold includes at least a sum of a first minimum threshold of a received signal communication parameter of the first cell and an offset of the first minimum threshold of the received signal communication parameter of the first cell; if the communication parameter value is less than or equal to the first threshold, obtain a second threshold from a broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell; determine whether the communication parameter value is greater than the second threshold; and if the communication parameter value is greater than the second threshold, set the first cell as a serving cell of the terminal device.

It is assumed that the terminal device 601 performs initial cell selection by means of coverage enhancement, and reselects a second cell by means of non-coverage enhancement. The terminal device 601 is configured to: after setting the first cell as the serving cell of the terminal device, measure a received signal communication parameter value of the second cell, where the second cell is any neighboring cell of the first cell; obtain a first threshold of the second cell or a first limit value of the second cell from the broadcast message, where the first threshold includes at least a sum of a first minimum threshold of the received signal communication parameter of the second cell and an offset of the first minimum threshold of the received signal core communication parameter of the second cell; determine whether the communication parameter value is greater than the first threshold, or whether a difference between the communication parameter value and the first threshold is greater than the first limit value; if the communication parameter value is greater than the first threshold, or the difference between the communication parameter value and the first threshold is greater than the first limit value, set the second cell as the serving cell of the terminal device; and if the communication parameter value is less than or equal to the first threshold, or the difference between the communication parameter value and the first threshold is less than or equal to the first limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

It is assumed that the terminal device 601 reselects a second cell by means of coverage enhancement based on that the terminal device 601 measures a received signal communication parameter value of a first cell, obtains a first threshold of the first cell, and determines that the received signal communication parameter value of the first cell is greater than the first threshold of the first cell, that is, selects the first cell as a serving cell by means of non-coverage enhancement. After it is determined whether the communication parameter value is greater than a first threshold of the first cell, the terminal device 601 is configured to:

if the received signal communication parameter value of the first cell is greater than the first threshold of the first cell, set the first cell as the serving cell of the terminal device;

measure a received signal communication parameter value of the second cell, where the second cell is any neighboring cell of the first cell; and when the received signal communication parameter value of the first cell is less than or equal to the first threshold of the first cell, obtain a second threshold of the second cell from the broadcast message, where the second threshold includes at least a sum of a second minimum threshold of the received signal communication parameter of the second cell and an offset of a first minimum threshold of the received signal communication parameter of the second cell, or when a difference between the received signal communication parameter value of the first cell and the first threshold of the first cell is less than or equal to a first limit value, obtain a second limit value of the second cell;

determine whether the received signal communication parameter value of the second cell is greater than the second threshold of the second cell, or whether a difference between the received signal communication parameter value of the second cell and the second threshold is greater than the second limit value;

if the communication parameter value is greater than the second threshold, or the difference between the communication parameter value and the second threshold is greater than the second limit value, set the second cell as the serving cell of the terminal device; and if the communication parameter value of the second cell is less than or equal to the second threshold, or the difference between the communication parameter value and the second threshold is less than or equal to the second limit value, obtain, from the broadcast message according to a value relationship between a frequency priority of the first cell and a frequency priority of the second cell, a corresponding parameter for selecting the second cell, to determine to set the second cell as the serving cell of the terminal device, where the corresponding parameter includes at least a hysteresis of the received signal communication parameter of the first cell and an offset of the received signal communication parameter of the second cell.

It should be noted that, before measuring the received signal communication parameter value of the first cell or measuring the received signal communication parameter value of the second cell, the terminal device first needs to receive the broadcast message sent by the base station to which the first cell belongs, where the broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, a frequency priority parameter of the first cell, a frequency priority parameter of the second cell, or a cell selection level parameter.

Particularly, the terminal device may repeatedly detect the broadcast message until the broadcast message is detected, and receive the broadcast message.

Further, after setting the second cell as the serving cell of the terminal device, the terminal device needs to send an update message to the base station, so that the base station transparently transmits the update message to a mobility management entity, and the mobility management entity pages the terminal device according to the update message, where the update message includes at least one of an identifier of the second cell, the hysteresis of the received signal communication parameter, the offset of the received signal communication parameter, or the second limit value.

The communication parameter is received signal strength or received signal quality;

when the communication parameter is received signal strength, the first threshold is A+A1+C, where A is a minimum threshold of a received signal strength value, A1 is an offset of the minimum threshold of the received signal strength value, and C is a compensation; and when the communication parameter is received signal quality, the first threshold is B+B1, where B is a minimum threshold of a received signal quality value, and B1 is an offset of the minimum threshold of the received signal quality value.

The base station 602 is configured to obtain the broadcast message, where the broadcast message includes at least one of a second minimum threshold of the communication parameter, an offset of the second minimum threshold of the communication parameter, the hysteresis of the received signal communication parameter of the first cell, the offset of the received signal communication parameter of the second cell, the second limit value of the second cell, the frequency priority parameter of the first cell, the frequency priority parameter of the second cell, or the cell selection level parameter, and the second cell is a neighboring cell of the first cell; and send the broadcast message to the terminal device, so that the terminal device selects a cell according to the broadcast message.

Particularly, the base station may obtain the broadcast message locally or from a request message, a response message, or an update message sent by a second base station to the first base station.

The base station may repeatedly send the broadcast message to the terminal device, so that the terminal device selects a cell according to the broadcast message.

Further, after sending the broadcast message to the terminal device, the base station 602 receives the update message sent by the terminal device, where the update message includes at least one of the identifier of the second cell, the hysteresis of the received signal communication parameter of the first cell, the offset of the received signal communication parameter of the second cell, or the second limit value, so as to transparently transmit the update message to the mobility management entity, so that the mobility management entity pages the terminal device according to the update message.

Embodiment 11

Figure 9:
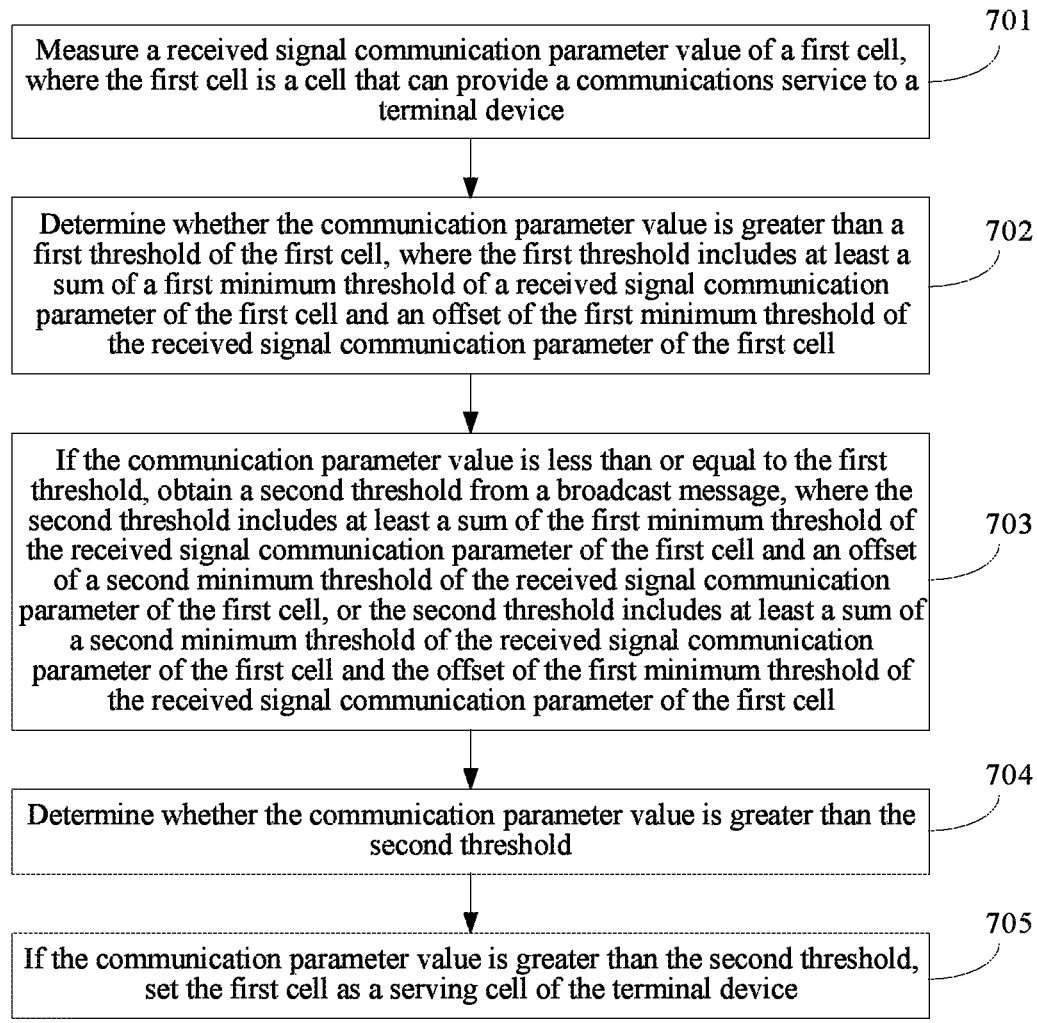
FIG. 9 is a flowchart of a method for cell selection according to an embodiment of the present invention.

This embodiment of the present invention provides a method for cell selection. The method is applied to a terminal device, and it is assumed that the terminal device performs initial cell selection by means of coverage enhancement. As shown in FIG. 9, the method includes:

Step 701: Measure a received signal communication parameter value of a first cell, where the first cell is a cell that can provide a communications service to the terminal device.

Before the terminal device measures the received signal communication parameter value of the first cell, when the terminal device is switched on or enters a signal coverage area from a coverage hole, the terminal device needs to detect a cell that can provide the communications service to the terminal device, and camp on the cell. If the terminal device does not store information about the cell that can provide the communications service to the terminal device, the terminal device searches an entire frequency band supported by the terminal device, and when the terminal device finds a frequency having a relatively strong frequency, the terminal device may measure a cell of the frequency, so that the terminal device camps on the cell. In this embodiment of the present invention, it is assumed that the terminal device finds the first cell after searching the entire frequency band, where the first cell is a cell that is detected by the terminal device and that can provide the communications service to the terminal device.

It should be noted that, if the terminal device stores information about the cell that can provide the communications service to the terminal device, the terminal device first measures the cell, and if the cell can provide the communications service to the terminal device, the terminal device camps on the cell. A process in which the terminal device searches the entire frequency band belongs to the prior art, and is not described in this embodiment of the present invention.

The communication parameter is received signal strength or received signal quality;

when the communication parameter is received signal strength, the first threshold is A+A1+C, where A is a minimum threshold of a received signal strength value, A1 is an offset of the minimum threshold of the received signal strength value, and C is a compensation; and when the communication parameter is received signal quality, the first threshold is B+B1, where B is a minimum threshold of a received signal quality value, and B1 is an offset of the minimum threshold of the received signal quality value.

Step 702: Determine whether the communication parameter value is greater than a first threshold of the first cell, where the first threshold includes at least a sum of a first minimum threshold of a received signal communication parameter of the first cell and an offset of the first minimum threshold of the received signal communication parameter of the first cell.

First, the terminal device receives a broadcast message sent by a base station to which the first cell belongs, and obtains, from the broadcast message, the first minimum threshold of the received signal communication parameter and the offset of the first minimum threshold of the received signal communication parameter.

It should be noted that, if the received signal communication parameter value of the first cell that is Obtained through measurement is less than or equal to the first threshold, the terminal device may continue to search the entire frequency band for another cell, when finding a cell, the terminal device may measure the cell, determine whether a received signal communication parameter value obtained through measurement is greater than a threshold of the cell, and if the received signal communication parameter value of the cell that is obtained through measurement is less than or equal to the threshold of the cell, and after searching and determining, there is no cell that can provide the communications service to the terminal device, sort, in a descending order, received signal communication parameter values of all cells that are obtained through measurement, and adjust a threshold of a cell having a highest received signal communication parameter, so that a received signal communication parameter obtained through measurement s greater than the threshold of the cell.

In this embodiment of the present invention, it is assumed that the communication parameter value is less than or equal to the first threshold, and step 703 is performed.

Step 703: If the communication parameter value is less than or equal to the first threshold, obtain a second threshold from a broadcast message, where the second threshold includes at least a sum of the first minimum threshold of the received signal communication parameter of the first cell and an offset of a second minimum threshold of the received signal communication parameter of the first cell, or the second threshold includes at least a sum of a second minimum threshold of the received signal communication parameter of the first cell and the offset of the first minimum threshold of the received signal communication parameter of the first cell.

It should be noted that, the second minimum threshold of the communication parameter of the first cell or the offset of the second minimum threshold of the communication parameter of the first cell may also be obtained locally. The terminal device may repeatedly detect the broadcast message until the broadcast message is detected, and receive the broadcast message.

When the broadcast message includes the second minimum threshold of the received signal strength, the second threshold includes a sum of the second minimum threshold of the received signal strength, the offset of the first minimum threshold of the received signal strength, and a compensation. When the broadcast message includes the offset of the second minimum threshold of the received signal strength, the second threshold includes a sum of the first minimum threshold of the received signal strength, the offset of the second minimum threshold of the received signal strength, and a compensation. The second minimum threshold of the received signal strength is less than the first minimum threshold of the received signal strength, and the offset of the second minimum threshold of the received signal strength is less than the offset of the first minimum threshold of the received signal strength.

Step 704: Determine whether the communication parameter value is greater than the second threshold.

The second minimum threshold of the communication parameter of the first cell is less than the first minimum threshold of the communication parameter, and the offset of the second minimum threshold of the communication parameter is less than the offset of the first minimum threshold of the communication parameter. In this way, the second threshold of the first cell is less than the first threshold of the first cell.

If the communication parameter s greater than the second threshold, step 705 is performed.

In this embodiment of the present invention, it is assumed that the communication parameter value is greater than the second threshold, and step 705 is performed.

Step 705: If the communication parameter value is greater than the second threshold, set the first cell as a serving cell of the terminal device.

After the first cell is set as the serving cell of the terminal device, a received signal communication parameter value of a second cell is measured, and the received signal communication parameter value of the first cell is constantly monitored, where the second cell is any neighboring cell of the first cell. A first minimum threshold of the communication parameter of the second cell or an offset of a first minimum threshold of the communication parameter is obtained from the broadcast message, it is determined whether the communication parameter value of the second cell is greater than a first threshold of the second cell, and if the communication parameter value is greater than the first threshold, the second cell is set as the serving cell of the terminal device. If the communication parameter value is less than or equal to the first threshold, a relationship between a frequency priority of the first cell and a frequency priority of the second cell is determined, so that the terminal device selects a corresponding cell reselection manner to select a suitable cell for the terminal device to camp on.

It should be noted that, the communication parameter may also be the received signal quality, the terminal device may also measure a received signal quality value of the first cell, and obtain, from the broadcast message, a first minimum threshold of the received signal quality and an offset of the first minimum threshold of the received signal quality, and may also obtain, from the broadcast message, a second minimum threshold of the received signal quality or an offset of the second minimum threshold of the received signal quality, and determine whether the received signal quality value of the first cell that is obtained through measurements greater than a sum of the first minimum threshold of the received signal quality and the offset of the first minimum threshold of the received signal quality, or determine whether the received signal quality value of the first cell that is obtained through measurement is greater than or equal to a sum of the second minimum threshold of the received signal quality and the offset of the first minimum threshold of the received signal quality, or determine whether the received signal quality value of the first cell that is obtained through measurement is greater than or equal to a sum of the first minimum threshold of the received signal quality and the offset of the second minimum threshold of the received signal quality, so that the terminal device selects an available serving cell, to provide the communications service to the terminal device.

Particularly, the terminal device may also measure a received signal strength value and a received signal quality value, and when the received signal strength value obtained through measurement is greater than a sum of a minimum threshold of the received signal strength, an offset of the minimum threshold of the received signal strength, and a compensation that are obtained from the broadcast message, and the received signal quality value obtained through measurement is greater than a sum of a minimum threshold of the received signal quality and an offset of the minimum threshold of the received signal quality that are obtained from the broadcast message, set the first cell as the serving cell of the terminal device, to provide the communications service to the terminal device.

In this way, when a received signal communication parameter value of a first cell that is obtained through measurement is less than or equal to a first threshold of the first cell, a second threshold is obtained, it is determined that the communication parameter value is greater than the second threshold, and the first cell is set as a serving cell of a terminal device, so that when the terminal device is in an idle state, a received signal communication parameter value obtained through measurement meets a cell selection requirement, and the terminal device can communicate normally.

In the method for cell selection provided in this embodiment of the present invention, when the terminal device performs cell selection for the first tune, the terminal device may also directly obtain, locally or from the broadcast message, the second minimum threshold of the received signal strength of the first cell or the offset of the second minimum threshold of the received signal strength, to obtain the second threshold, determine whether the received signal strength value obtained through measurement is greater than the second threshold, and if the received signal strength value obtained through measurement is greater than the second threshold, set the first cell as the serving cell of the terminal device. In this way, the terminal device may quickly select a suitable cell for the terminal device to camp on, and the terminal device communicates normally.

Exemplarily, it is assumed that the communication parameter is the received signal strength. Generally, the received signal strength value of the first cell that is obtained through measurement may be represented by $Q_{rxlevmeas}$, the first minimum threshold of the received signal strength of the first cell may be represented by $Q_{rxlevmin}$, the offset of the first minimum threshold of the received signal strength of the first cell may be represented by $Q_{rxlevminoffset}$, the compensation may be represented by $P_{compensation}$, and the first threshold may be represented by $(Q_{rxlevmin}+Q_{rxlevminoffset})+P_{compensation}$. When the received signal strength value of the first cell obtained through measurement is less than or equal to the first threshold, that is, $Q_{rxlevmeas} \leq (Q_{rxlevmin}+Q_{rxlevminoffset})+P_{compensation}$, the second threshold of the first cell is obtained.

The second minimum threshold of the received signal strength of the first cell may be represented by $Q_{rxlevmin\_ce}$, the offset of the second minimum threshold of the received signal strength of the first cell may be represented by $Q_{rxlevminoffset\_ce}$, and the second threshold may be represented by $(Q_{rxlevmin}+Q_{rxlevminoffset\_ce})+P_{compensation}$ or $(Q_{rxlevmin\_ce}+Q_{rxlevminoffset})+P_{compensation}$. When the received signal strength value obtained through measurement is greater than the second threshold, that is, $Q_{rxlevmeas} > (Q_{rxlevmin}+Q_{rxlevminoffset\_ce})+P_{compensation}$ or $Q_{rxlevmeas} > (Q_{rxlevmin\_ce}+Q_{rxlevminoffset})+P_{compensation}$, the first cell is set as the serving cell of the terminal device.

$P_{compensation}=Max(P_{EMax}-P_{UMax},0)$, where $P_{EMax}$ is maximum uplink transmit power allowed for the terminal device in the first cell, and is obtained front the broadcast message, $P_{UMax}$ is a maximum uplink transmit power determined by a capability of the terminal device, $P_{compensation}=Max(P_{EMax}-P_{UMax}, 0)$ instructs to obtain a maximum value from 0 and a difference between the maximum uplink transmit power allowed for the terminal device in the first cell and the maximum uplink transmit power determined by the capability of the terminal device, and $P_{compensation}$ is a value greater than or equal to 0. When $P_{EMax}$ is greater than $P_{UMax}$, and $P_{compensation}$ is greater than 0, an access range of the terminal device at a cell edge is reduced, to avoid problems such as service drop and access failure caused due to insufficient transmit power of the terminal device. When $P_{EMax}$ is less than $P_{UMax}$, and $P_{compensation}$ is equal to 0, the terminal device may camp on the cell according to the maximum uplink transmit power and access a network. $Q_{rxlevminoffset}$ is used as a compensation value of $Q_{rxlevmin}$ only when the terminal device periodically searches for a high-priority PLMN (Public Land Mobile Network, public land mobile network). $Q_{rxlevmeas}$ is an actual value of RSRP (Reference Signal Receiving Power, reference signal received power) of the first cell that is obtained by the terminal device through measurement. During actual application, $Q_{rxlevmin}$ is an integer, and may be any negative integer from −70 to −22, and $Q_{rxlevminoffset}$ is also an integer, and may be any integer from 1 to 8.

It is assumed that the received signal strength value $Q_{rxlevmeas}$ of the first cell that is obtained through measurement is −45, the first minimum threshold $Q_{rxlevmin}$ of the received signal strength of the first cell is −50, the offset $Q_{rxlevminoffset}$ of the first minimum threshold of the received signal strength of the first cell is 7, and the compensation $P_{compensation}$ is 0. Then the first threshold is −50+7+0. It is determined whether the received signal strength value of the first cell that is obtained through measurement is greater than the first threshold of the first cell, and the received signal strength value obtained through measurement is less than the first threshold, that is, −45<−50+7+0. Then the terminal device obtains the second threshold of the first cell from the broadcast message, and determines whether the received signal strength value of the first cell that is obtained through measurement is greater than the second threshold of the first cell.

It is assumed that the second minimum threshold $Q_{rxlevmin\_ce}$ of the received signal strength of the first cell that is included in the broadcast message is −55, the received signal strength value $Q_{rxlevmeas}$ of the first cell that is obtained through measurement is −45, the offset $Q_{rxlevminoffset}$ of the first minimum threshold of the received signal strength of the first cell is 7, and the compensation $P_{compensation}$ is 0. Then the second threshold is −55+7+0. It is determined whether the received signal strength value of the first cell that is obtained through measurement is greater than the second threshold of the first cell, and the received signal strength value of the first cell that is obtained through measurement is greater than the second threshold of the first cell, that is, −45>−55+7+0. Then the first cell is set as the serving cell of the terminal device.

Alternatively, it is assumed that the offset $Q_{rxlevminoffset\_ce}$ of the second minimum threshold of the received signal strength of the first cell that is included in the broadcast message is 2, the received signal strength value $Q_{rxlevmeas}$ of the first cell that is obtained through measurement is −45, the first minimum threshold $Q_{rxlevmin}$ of the received signal strength of the first cell is −50, and the compensation $P_{compensation}$ is 0. Then the second threshold is −50+2+0. It is determined whether the received signal strength value of the first cell that is obtained through measurement is greater than the second threshold of the first cell, and the received signal strength value of the first cell that is obtained through measurement is greater than the second threshold of the first cell, that is, −45>−50+2+0. Then the first cell is set as the serving cell of the terminal device.

Particularly, the terminal device may further obtain a common offset from the broadcast message, where the common offset may be represented by $Q_{offset}$, and the common offset $Q_{offset}$ is enumerated, and may be any one of −24, −22, −20, −18, −16, −14, −12, −10, −8, −6, −5, −4, −3, −2, −1, 0, 1, 2, 3, 4, 5, 6, 8, 10, 12, 14, 16, 18, 20, 22, and 24. When the received signal strength value of the first cell that is obtained through measurement is less than or equal to the first threshold of the first cell, the first threshold of the first cell is reduced by using the common offset, so as to obtain the second threshold of the first cell, so that the received signal strength value of the first cell that is obtained through measurement is greater than the second threshold of the first cell, and the first cell is set as the serving cell of the terminal device.

Exemplarily, it is assumed that the received signal strength value $Q_{rxlevmeas}$ of the first cell that is obtained through measurement is −45, the first minimum threshold $Q_{rxlevmin}$ of the received signal strength of the first cell is −50, the offset $Q_{rxlevminoffset}$ of the first minimum threshold of the received signal strength of the first cell is 7, the compensation $P_{compensation}$ is 0, and the common offset $Q_{offset}$ is 3. Then the first threshold is −50−3+7+0. It is determined whether the received signal strength value of the first cell that is obtained through measurement is greater than the second threshold of the first cell, and the received signal strength value obtained through measurement is greater than the second threshold of the first cell, that is, 45>−50−3+7+0. Then the first cell is set as the serving cell of the terminal device.

It should be noted that, when the terminal device performs cell selection for the first time, the terminal device may also directly obtain, locally or from the broadcast message, the second minimum threshold of the received signal strength of the first cell or the offset of the second minimum threshold of the received signal strength, to obtain the second threshold of the first cell, determine whether the received signal strength value of the first cell that is obtained through measurement is greater than the second threshold of the first cell, and if the received signal strength value of the first cell that is obtained through measurement is greater than the second threshold of the first cell, set the first cell as the serving cell of the terminal device. In this way, the terminal device may quickly select a suitable cell for the terminal device to camp on, a cell selection time of the terminal device is reduced, and the terminal device communicates normally.

Embodiment 12

Figure 10:
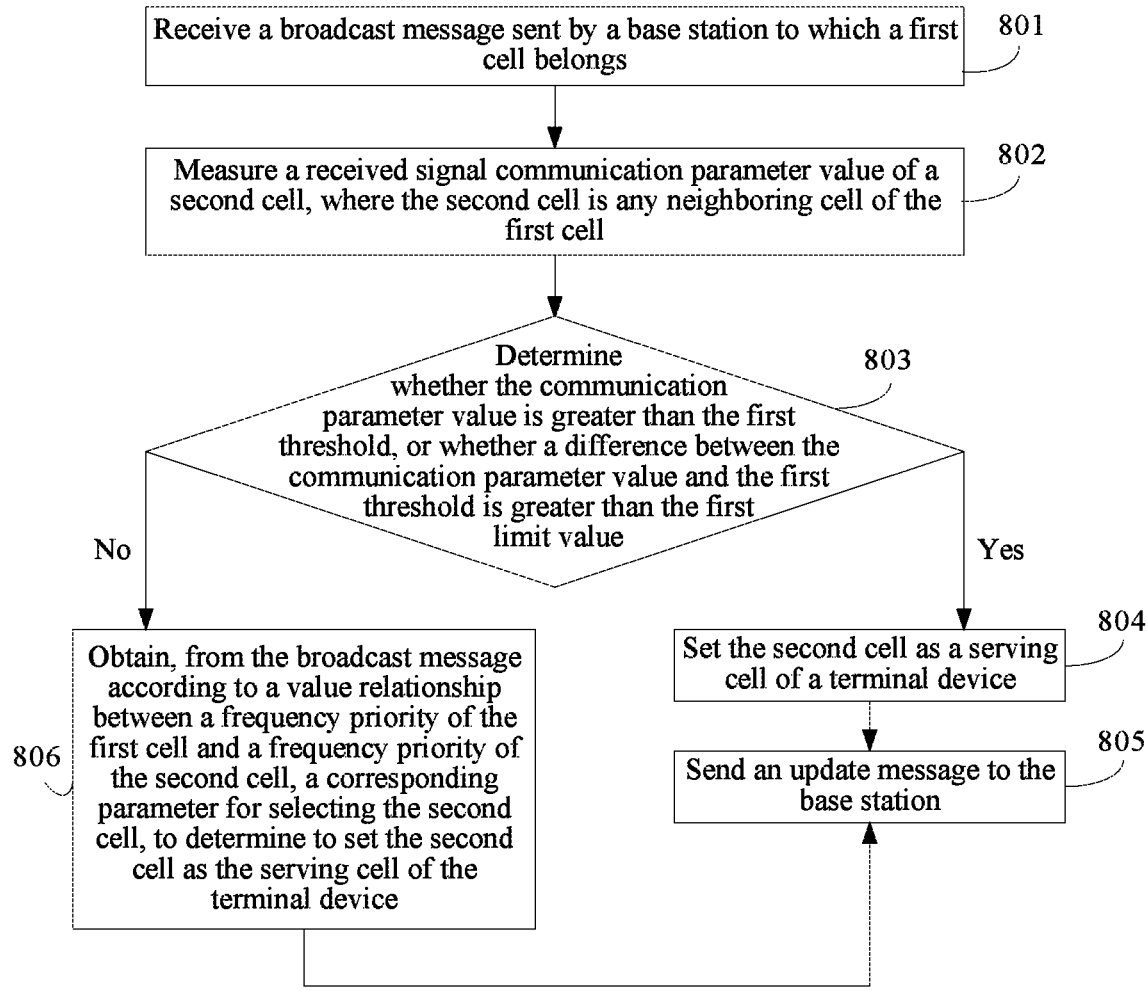
FIG. 10 is a flowchart of another method for cell selection according to an embodiment of the present invention.

This embodiment of the present invention provides a method for cell selection. The method is applied to a terminal device, and it is assumed that the terminal device selects a first cell as a serving cell by means of coverage enhancement, and reselects a second cell by means of non-coverage enhancement. As shown in FIG. 10, the method includes:

Step 801: Receive a broadcast message sent by a base station to which a first cell belongs.

The broadcast message includes at least one of a first minimum threshold of a communication parameter of a second cell, an offset of the first minimum threshold of the communication parameter of the second cell, a first limit value of the second cell, or a cell selection level parameter.

The terminal device may obtain, from the broadcast message, the first limit value of the second cell, the first minimum threshold of the received signal communication parameter of the second cell, the offset of the first minimum threshold of the received signal communication parameter of the second cell, and maximum uplink transmit power allowed for the terminal device in the second cell. Generally, the first limit value of the second cell may be represented by $Thresh_{serving,low}$.

The cell selection level parameter is used by the terminal device to exchange a message with the base station after the terminal device successfully camps on the first cell by means of coverage enhancement, and the terminal device first uses a low level of the cell selection level parameter to perform message exchange between the terminal device and the base station, that is, a message sent during interaction between the terminal device and the base station may be repeatedly sent between the terminal device and the base station. If information exchange between the terminal device and the base station cannot be met even though the terminal device uses the low level of the cell selection level parameter, a medium level or a high level of the cell selection level parameter may be used to repeatedly send, between the terminal device and the base station, the message sent during interaction between the terminal device and the base station, so as to implement information exchange between the terminal device and the base station.

Step 802: Measure a received signal communication parameter value of a second cell, where the second cell is any neighboring cell of the first cell, and obtain a first threshold of the second cell or a first limit value of the second cell is obtained from the broadcast message, where the first threshold includes at least a sum of the first minimum threshold of the received signal communication parameter of the second cell and the offset of the first minimum threshold of the received signal communication parameter of the second cell.

Step 803: Determine whether the communication parameter value is greater than the first threshold, or whether a difference between the communication parameter value and the first threshold is greater than the first limit value.

If the communication parameter value is greater than the first threshold, or the difference between the communication parameter value and the first threshold is greater than the first limit value, step 804 is performed.

If the communication parameter value is less than or equal to the first threshold, or the difference between the communication parameter value and the first threshold is less than or equal to the first limit value, step 806 is performed.

In this embodiment of the present invention, it is assumed that the communication parameter value is greater than the first threshold, or the difference between the communication parameter value and the first threshold is greater than the first limit value, and step 804 is performed.

Step 804: Set the second cell as a serving cell of the terminal device.

Step 805: Send an update message to the base station.

The update message is sent to the base station, so that the base station transparently transmits the update message to a mobility management entity, and the mobility management entity pages the terminal device according to the update message, where the update message includes an identifier of the second cell, the first threshold of the received signal communication parameter of the second cell, or the first limit value of the second cell.

Step 806: Obtain, from the broadcast message according to a value relationship between a frequency priority of the first cell and a frequency priority of the second cell, a corresponding parameter for selecting the second cell, to determine to set the second cell as the serving cell of the terminal device.

The corresponding parameter includes at least a hysteresis of the received signal communication parameter of the first cell and an offset of the received signal communication parameter of the second cell. Step 805 is performed to:

send an update message to the base station, so that the base station transparently transmits the update message to the mobility management entity, and the mobility management entity pages the terminal device according to the update message, where the update message includes the identifier of the second cell and the corresponding parameter of the second cell that is obtained according to the frequency priority of the second cell.

The corresponding parameter includes at least one of the hysteresis of the received signal communication parameter of the first cell, the offset of the received signal communication parameter of the second cell, a second limit value of the first cell, or the second limit value of the second cell.

In this way, when a received signal communication parameter value of a first cell that is obtained through measurement is less than or equal to a first threshold of the first cell, a second threshold is obtained, it is determined that the communication parameter value is greater than the second threshold, and after the first cell is set as a serving cell of a terminal device, a communication parameter value of a second cell is greater than a first threshold of the second cell, or a difference between the communication parameter value of the second cell and the first threshold is greater than a first limit value, so that the terminal device can reselect the second cell, and communication quality of the terminal device is improved in a case in which the terminal device communicates normally.

Embodiment 13

Figure 11:
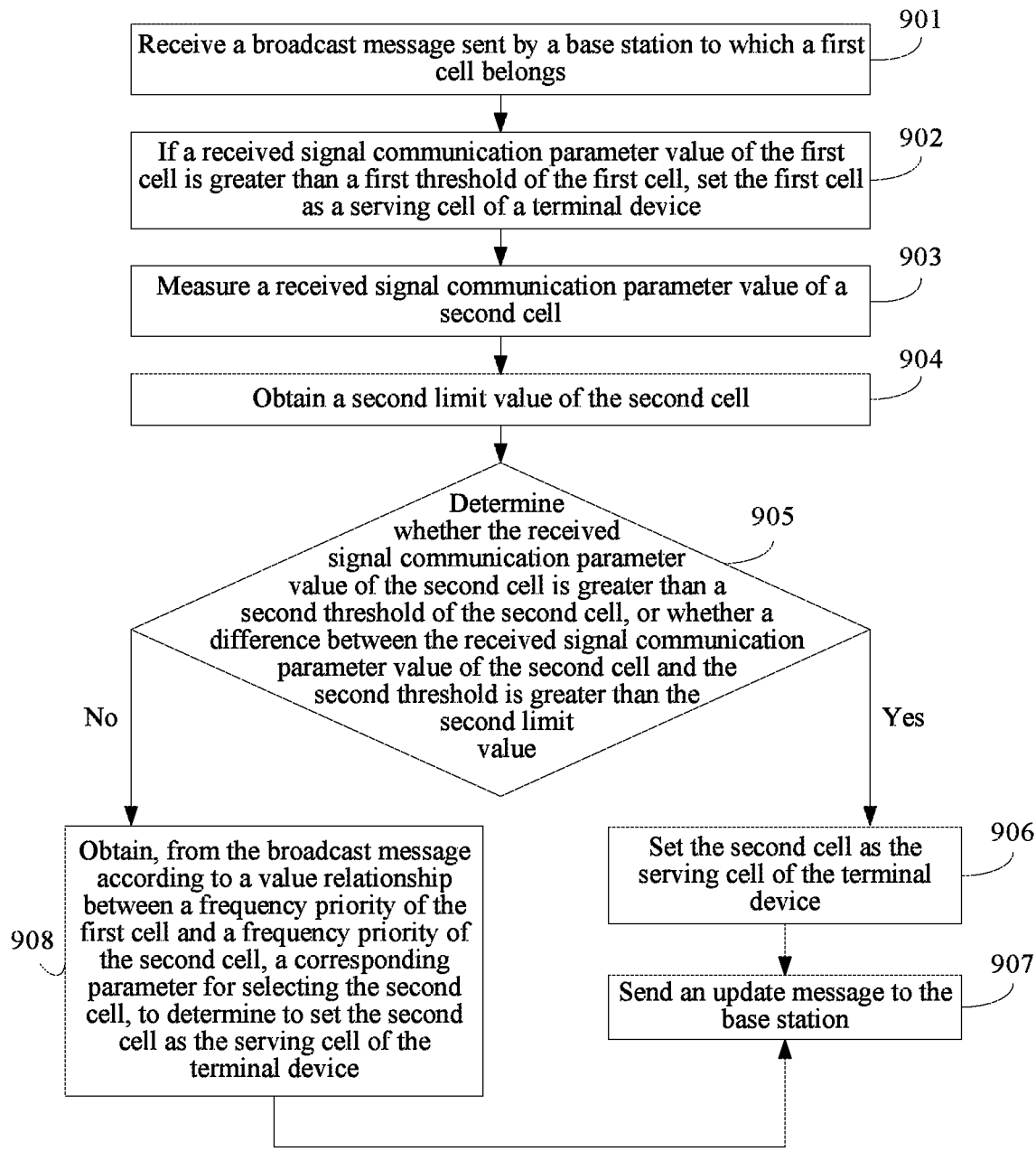
FIG. 11 is a flowchart of still another method for cell selection according to an embodiment of the present invention.

This embodiment of the present invention provides a method for cell selection. The method is applied to a terminal device, and it is assumed that the terminal device measures a received signal communication parameter value of a first cell, obtains a first threshold of the first cell, and determines that the received signal communication parameter value of the first cell is greater than the first threshold of the first cell, that is, selects the first cell as a serving cell by means of non-coverage enhancement, and reselects a second cell by means of coverage enhancement. As shown in FIG. 11, the method includes:

Step 901: Receive a broadcast message sent by a base station to which a first cell belongs.

The broadcast message includes at least one of a second minimum threshold of a communication parameter, an offset of the second minimum threshold of the communication parameter, a hysteresis of the received signal communication parameter of the first cell, an offset of the received signal communication parameter of a second cell, a second limit value of the second cell, a frequency priority parameter of the first cell, a frequency priority parameter of the second cell, or a cell selection level parameter.

It should be noted that, the terminal device may repeatedly detect the broadcast message until the broadcast message is detected, and receive the broadcast message.

Step 902: If a received signal communication parameter value of the first cell is greater than a first threshold of the first cell, set the first cell as a serving cell of the terminal device.

Step 903: Measure a received signal communication parameter value of a second cell.

The second cell is any neighboring cell of the first cell.

Step 904: Obtain a second limit value of the second cell.

When the received signal communication parameter value of the first cell is less than or equal to the first threshold of the first cell, a second threshold of the second cell is obtained from the broadcast message, or when a difference between the received signal communication parameter value of the first cell and the first threshold of the first cell is less than or equal to a first limit value, a second limit value of the second cell is obtained.

The second threshold includes at least a sum of a second minimum threshold of the received signal communication parameter of the second cell and an offset of a first minimum threshold of the received signal communication parameter of the second cell.

Step 905: Determine whether the received signal communication parameter value of the second cell is greater than the second threshold of the second cell, or whether a difference between the received signal communication parameter value of the second cell and the second threshold is greater than the second limit: value.

If the communication parameter value is greater than the second threshold, or the difference between the communication parameter value and the second threshold is greater than the second limit value, step 906 is performed.

If the communication parameter value of the second cell is less than or equal to the second threshold, or the difference between the communication parameter value and the second threshold is less than or equal to the second limit value, step 907 is performed.

Step 906: Set the second cell as the serving cell of the terminal device.

Step 907: Send an update message to the base station, so that the base station transparently transmits the update message to a mobility management entity, and the mobility management entity pages the terminal device according to the update message, where the update message includes an identifier of the second cell, and the second threshold of the received signal communication parameter of the second cell or the second limit value of the second cell.

Step 908: Obtain, from the broadcast message according to a value relationship between a frequency priority of the first cell and a frequency priority of the second cell, a corresponding parameter for selecting the second cell, to determine to set the second cell as the serving cell of the terminal device.

The corresponding parameter includes at least the hysteresis of the received signal communication parameter of the first cell and the offset of the received signal communication parameter of the second cell. Step 907 is performed, so that the base station transparently transmits the update message to the mobility management entity, and the mobility management entity pages the terminal device according to the update message, where the update message includes the identifier of the second cell and the corresponding parameter of the second cell that is obtained according to the frequency priority of the second cell.

In this way, after a first cell is set as a serving cell of a terminal device when a received signal communication parameter value of the first cell that is obtained through measurement is greater than a first threshold of the first cell, if the received signal communication parameter value of the first cell is less than or equal to the first threshold of the first cell, a second threshold of a second cell is obtained from a broadcast message, it is determined that a communication parameter value of the second cell is greater than the second threshold of the second cell, or a difference between the communication parameter value of the second cell and the second threshold is greater than a second limit value, so that the terminal device can reselect the second cell, and communication quality of the terminal device is improved in a case in which the terminal device communicates normally.

Embodiment 14

Figure 12:
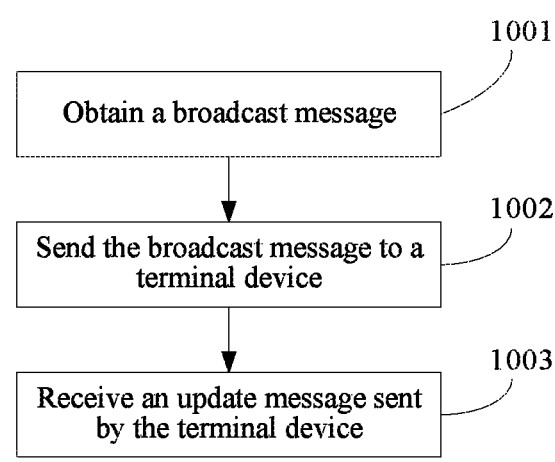
FIG. 12 is a flowchart of yet another method for cell selection according to an embodiment of the present invention.

This embodiment of the present invention provides a method for cell selection. As shown in FIG. 12, the method includes:

Step 1001: Obtain a broadcast message.

The broadcast message includes at least one of a second minimum threshold of a communication para an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell.

The broadcast message is obtained locally or from a request message, a response message, or an update message sent by a second base station to the first base station.

The broadcast message is repeatedly sent to a terminal device, so that the terminal device selects a cell according to the broadcast message.

Step 1002: Send the broadcast message to a terminal device, so that the terminal device selects a cell according to the broadcast message.

Step 1003: Receive an update message sent by the terminal device.

The update message includes at least one of an identifier of the second cell, the hysteresis of the received signal communication parameter of the first cell, the offset of the received signal communication parameter of the second cell, or the second limit value, so as to transparently transmit the update message to a mobility management entity, so that the mobility management entity pages the terminal device according to the update message.

In this way, a base station obtains a broadcast message; sends the broadcast message to a terminal device, so that the terminal device selects a cell according to the broadcast message, and the terminal device can communicate normally, where the broadcast message includes at least one of a second minimum threshold of a communication parameter, an offset of the second minimum threshold of the communication parameter, a hysteresis of the received signal communication parameter of a first cell, an offset of the received signal communication parameter of a second cell, a second limit value of the second cell, a frequency priority parameter of the first cell, a frequency priority parameter of the second cell, or a cell selection level parameter, and the second cell is a neighboring cell of the first cell; and receives an update message sent by the terminal device, so as to transparently transmit the update message to a mobility management entity, so that the mobility management entity pages the terminal device according to the update message.

Embodiment 15

This embodiment of the present invention provides a terminal device. When the terminal device reselects a neighboring cell of a first cell, that is, a second cell that can provide a communications service to the terminal device, if a communication parameter value of the second cell is less than or equal to a first threshold of the second cell, the terminal device needs to obtain, from a broadcast message according to a value relationship between a carrier priority of the second cell and a carrier priority of the first cell, a corresponding parameter for selecting the second cell, and select different measurement starting rules, to determine to set the second cell as a serving cell of the terminal device, so that the terminal device communicates normally.

Generally, a cell carrier priority is configured in a base station, the base station notifies the terminal device of a cell carrier priority of the terminal device by sending the broadcast message, and the broadcast message carries the cell carrier priority. When the terminal device performs cell reselection, the cell carrier priority may be represented by cellReselectionPriority, the cell carrier priority ranges from 0 to 7, and a larger value of the cell carrier priority indicates a higher reselection priority of all cells on a corresponding carrier.

When the terminal device performs cell reselection, if a frequency priority of the first cell is equal to a frequency priority of the second cell, where the second cell is the neighboring cell of the first cell, the terminal device obtains $R_{s1}$ or $R_{n1}$, where $R_{s1}$ is a sum of a received signal strength value of the first cell and a second hysteresis of the received signal strength of the first cell, and $R_{n1}$ is a difference between a received signal strength value of the second cell and a second offset of the received signal strength of the second cell. The terminal device determines whether $R_{s1}$ is less than $R_{n1}$, and if $R_{s1}$ is less than $R_{n1}$, sets the second cell as the serving cell of the terminal device.

Generally, a first hysteresis of a communication parameter of the first cell may be represented by $Q_{Hyst}$, a first offset of the communication parameter of the second cell may be represented by $Q_{offset}$, $R_s=Q_{meas,s}+Q_{Hyst}$, $R_n=Q_{meas,n}-Q_{offset}$, and when $R_n>R_s$, a criterion R is met, where $Q_{Hyst}$ and $Q_{offset}$ are used to prevent a ping-pong effect during cell reselection.

The second hysteresis of the received signal strength of the first cell may be represented by $Q_{Hyst\_ce}$, the second offset of the received signal strength of the second cell may be represented by $Q_{offset\_ce}$, $R_{s1}=Q_{meas,s}+Q_{Hyst\_ce}$, $R_{n1}=Q_{meas,n}-Q_{offset\_ce}$, and when $R_{n1}>R_{s1}$, the criterion R is met. The second hysteresis of the communication parameter is less than the first hysteresis of the communication parameter, and the second offset of the communication parameter is less than the first offset of the communication parameter.

When the terminal device performs cell reselection, if the frequency priority of the first cell is higher than the frequency priority of the second cell, where the second cell is the neighboring cell of the first cell, the terminal device determines whether a difference between a communication parameter value of the first cell and a second threshold of the first cell is less than a second limit value of the first cell, and whether a difference between the core communication parameter value of the second cell and a second threshold of the second cell is greater than a second limit value of the second cell.

If the difference between the communication parameter value of the first cell and the second threshold of the first cell is less than the second limit value of the first cell, and the difference between the communication parameter value of the second cell and the second threshold of the second cell is greater than the second limit value of the second cell, the second cell is set as the serving cell of the terminal device.

When the terminal device performs cell reselection, if the frequency priority of the first cell is lower than the frequency priority of the second cell, where the second cell is the neighboring cell of the first cell, the terminal device determines whether a difference between the communication parameter value of the second cell and the second threshold of the second cell is greater than the second limit value of the second cell, and if the difference between the communication parameter value of the second cell and the second threshold of the second cell is greater than the second limit value of the second cell, sets the second cell as the serving cell of the terminal device.

Likewise, when the terminal device reselects the neighboring cell of the first cell, that is, the second cell that can provide the communications service to the terminal device, when the communication parameter value of the first cell is less than or equal to the first threshold of the second cell, and the communication parameter value of the second cell is less than or equal to the second threshold of the second cell, the terminal device needs to obtain, from the broadcast message according to the value relationship between the carrier priority of the second cell and the carrier priority of the first cell, a corresponding parameter for selecting the second cell, and select different measurement starting rules, to determine to set the second cell as the serving cell of the terminal device, so that the terminal device communicates normally.

When the terminal device performs cell reselection, if the frequency priority of the first cell is equal to the frequency priority of the second cell, where the second cell is the neighboring cell of the first cell, the terminal device obtains $R_{s1}$ or $R_{n1}$, where $R_{s1}$ is a sum of a received signal strength value of the first cell and the second hysteresis of the received signal strength of the first cell, and $R_{n1}$ is a difference between a received signal strength value of the second cell and the second offset of the received signal strength of the second cell. The terminal device determines whether $R_{s1}$ is less than $R_{n1}$, and if $R_{s1}$ is less than $R_{n1}$, sets the second cell as the serving cell of the terminal device.

Generally, the first hysteresis of the communication parameter of the first cell may be represented by $Q_{Hyst}$, the first offset of the communication parameter of the second cell may be represented by $Q_{offset}$, $R_s=Q_{meas,s}+Q_{Hyst}$, $R_n=Q_{meas,n}-Q_{offset}$, and when $R_n>R_s$, a criterion R is met, where $Q_{Hyst}$ and $Q_{offset}$ are used to prevent a ping-pong effect during cell reselection.

The second hysteresis of the received signal strength of the first cell may be represented by $Q_{Hyst\_ce}$, the second offset of the received signal strength of the second cell may be represented by $Q_{offset\_ce}$, $R_{s1}=Q_{meas,s}+Q_{Hyst\_ce}$, $R_{n1}=Q_{meas,n}-Q_{offset\_ce}$, and when $R_{n1}>R_{s1}$, the criterion R is met. The second hysteresis of the communication parameter is less than the first hysteresis of the communication parameter, and the second offset of the communication parameter is less than the first offset of the communication parameter.

When the terminal device performs cell reselection, if the frequency priority of the first cell is higher than the frequency priority of the second cell, where the second cell is the neighboring cell of the first cell, the terminal device determines whether the difference between the communication parameter value of the first cell and the second threshold of the first cell is less than the second limit value of the first cell, and whether the difference between the communication parameter value of the second cell and the second threshold of the second cell is greater than the second limit value of the second cell.

If the difference between the communication parameter value of the first cell and the second threshold of the first cell is less than the second limit value of the first cell, and the difference between the communication parameter value of the second cell and the second threshold of the second cell is greater than the second limit value of the second cell, the second cell is set as the serving cell of the terminal device.

When the terminal device performs cell reselection, if the frequency priority of the first cell is lower than the frequency priority of the second cell, where the second cell is the neighboring cell of the first cell, the terminal device determines whether the difference between the communication parameter value of the second cell and the second threshold of the second cell is greater than the second limit value of the second cell, and if the difference between the communication parameter value of the second cell and the second threshold of the second cell is greater than the second limit value of the second cell, sets the second cell as the serving cell of the terminal device.

Exemplarily, after the terminal device selects the first cell by means of coverage enhancement, and sets the first cell as the serving cell of the terminal device, if the terminal device moves from a place having a relatively weak received signal to a place having a relatively strong received signal, and the second cell has a relatively strong received signal, the terminal device reselects the second cell by means of non-coverage enhancement. However, when the terminal device moves front the place having a relatively strong received signal back to the place having a relatively weak received signal, in this case, the second cell also has a relatively weak received signal, and a received communication parameter value obtained by the terminal device through measurement cannot meet a criterion S. The terminal device performs cell reselection by determining the frequency priority of the first cell and the frequency priority of the second cell.

After the terminal device selects the first cell by means of non-coverage enhancement, and sets the first cell as the serving cell of the terminal device, if the terminal device moves from a place having a relatively strong received signal to a place having a relatively weak received signal, and the second cell has a relatively weak received signal, the terminal device reselects the second cell by means of coverage enhancement. In this case, for the terminal device, the frequency priority of the first cell may be lower than the frequency priority of the second cell. Moreover, the terminal device may also perform cell reselection by determining the frequency priority of the first cell and the frequency priority of the second cell.

In this way, after the terminal device selects a second cell by means of non-coverage enhancement, and sets the second cell as a serving cell of the terminal device, when a communication parameter value of the second cell is less than or equal to a first threshold of the second cell, or after the terminal device selects a second cell by means of coverage enhancement, and sets the second cell as a serving cell of the terminal device, when a communication parameter value of a first cell is less than or equal to a first threshold of the second cell, or a communication parameter value of the second cell is less than or equal to a second threshold of the second cell, the terminal device may obtain, from a broadcast message according to a value relationship between a carrier priority of the second cell and a carrier priority of the first cell, a corresponding parameter for selecting the second cell, and select different measurement starting rules, to determine to set the second cell as the serving cell of the terminal device, so that the terminal device communicates normally.

In the related embodiments of the present invention, before a terminal device selects a suitable cell for the terminal device to camp on, the terminal device first needs to obtain a broadcast message from a base station to which the measured cell belongs, where the broadcast message may be a first system information block. Currently, the first system information block is sent in the fifth subframe of each even-numbered frame. However, in a coverage enhancement mode, the terminal cannot obtain the first information block in an existing manner.

Embodiment 16

It is assumed that the base station first repeatedly sends the broadcast message, and then the terminal device may obtain a first time period from configuration information that is preset locally. Based on the assumption, the terminal repeatedly receives, within the first time period, the broadcast message repeatedly sent by the base station, and combines and parses the repeatedly received broadcast message, so as to obtain content of the broadcast message.

Embodiment 17

It is assumed that the base station first repeatedly sends the broadcast message, and then the terminal device may obtain a first time period from configuration information that is preset locally. Based on the assumption, the terminal device performs a modulo operation on the first time period from a system frame number, when a frame 0 starts after the modulo operation is performed on the first time period, uses the first time period as a receive window, repeatedly receives the broadcast message within the receive window, and combines and parses the repeatedly received broadcast message, so as to obtain content of the broadcast message. Exemplarily, assuming that the first time period is N, a value is a time period from a time at which the system frame 0 starts after the terminal device performs a modulo operation on N from the system frame number to a time at which a frame N−1 ends after the terminal device performs the modulo operation on N from the system frame number, that is, N continuous frames are used as a receive window.

Embodiment 18

It is assumed that the base station first repeatedly sends the broadcast message, and then the terminal device may obtain a first time period from configuration information that is preset locally. Based on the assumption, the terminal device obtains a time point of the broadcast message from a start moment of a receive window, uses the first time period as the receive window, constantly slides the receive window, repeatedly receives the broadcast message within the receive window, and combines and parses the repeatedly received broadcast message, until the broadcast message is parsed. The start moment of the receive window may be a start moment of any frame in system frames, and N continuous frames are used as the receive window.

Embodiment 19

Based on Embodiment 16 to Embodiment 18, the first time period is a quantity of times of broadcast message combination that is supported by the base station and that corresponds to a maximum coverage enhancement level or the first time period is a system information modification period.

Embodiment 20

Based on Embodiment 16 to Embodiment 19, the first time period is an integer multiple of 64 frames.

Embodiment 21

Based on Embodiment 16 to Embodiment 20, the obtaining a first time period is obtaining the broadcast message from the configuration information preset by the terminal device.

Embodiment 22

The terminal device may obtain, from content of the first system information block, at least one second system information block received by means of coverage enhancement, where each second system information is different from the first system information block.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections gray be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communications apparatus, comprising:
   at least one processor; and
   a non-transitory computer-readable storage medium coupled to the at least one processor and storing programming instructions for execution by the at least one processor, the programming instructions instruct the at least one processor to:
   measure a received signal communication parameter value of a first cell, wherein the first cell is a cell that is capable of providing a communications service to a terminal device;
   if the received signal communication parameter value of the first cell is less than or equal to a first threshold of the first cell, obtain a second threshold of the first cell, wherein the first threshold of the first cell is greater than or equal to a first minimum threshold of a received signal communication parameter of the first cell, and wherein the second threshold of the first cell is greater than or equal to a second minimum threshold of the received signal communication parameter of the first cell; and
   when the received signal communication parameter value of the first cell is greater than the second threshold of the first cell, set the first cell as a serving cell of the terminal device.

2. The communications apparatus according to claim 1, wherein setting the first cell as a serving cell of the terminal device comprises setting the first cell as a serving cell of the terminal device in an enhanced coverage mode.

3. The communications apparatus according to claim 1, wherein the first threshold of the first cell comprises at least a sum of the first minimum threshold of the received signal communication parameter of the first cell and an offset of the first minimum threshold of the received signal communication parameter of the first cell, and wherein the second threshold of a second cell comprises at least a sum of the second minimum threshold of the received signal communication parameter of the first cell and the offset of the first minimum threshold of the received signal communication parameter of the first cell.

4. The communications apparatus according to claim 1, wherein the programming instructions further instruct the at least one processor to:
   measure a received signal communication parameter value of a second cell after setting the first cell as the serving cell of the terminal device, wherein the second cell is a neighboring cell of the first cell;
   obtain a first threshold of the second cell, wherein the first threshold of the second cell is greater than or equal to a first minimum threshold of the received signal communication parameter of the second cell; and
   if the received signal communication parameter value of the second cell is greater than the first threshold of the second cell, set the second cell as the serving cell of the terminal device.

5. The communications apparatus according to claim 4, wherein setting the second cell as a serving cell of the terminal device comprises setting the second cell as a serving cell of the terminal device in a non-enhanced coverage mode.

6. The communications apparatus according to claim 4, wherein the first threshold of the second cell comprises at least a sum of the first minimum threshold of the received signal communication parameter of the second cell and an offset of the first minimum threshold of the received signal communication parameter of the second cell.

7. The communications apparatus according to claim 4, wherein:
   the received signal communication parameter of the second cell is received signal strength of the second cell, and the received signal communication parameter value of the second cell is a received signal strength value of the second cell; or
   the received signal communication parameter of the second cell is received signal quality of the second cell, and the received signal communication parameter value of the second cell is a received signal quality value of the second cell.

8. The communications apparatus according to claim 1, wherein:
   the received signal communication parameter of the first cell is received signal strength of the first cell, and the received signal communication parameter value of the first cell is a received signal strength value of the first cell; or
   the received signal communication parameter of the first cell is received signal quality of the first cell, and the received signal communication parameter value of the first cell is a received signal quality value of the first cell.

9. The communications apparatus according to claim 1, wherein the communications apparatus further comprises:
   a receiver, the receiver configured to receive a broadcast message from a base station to which the first cell belongs, wherein the broadcast message comprises the first minimum threshold of a received signal communication parameter of the first cell and the second minimum threshold of the received signal communication parameter of the first cell.

10. A communications apparatus, comprising:
at least one processor; and
a non-transitory computer-readable storage medium coupled to the at least one processor and storing programming instructions for execution by the at least one processor, the programming instructions instruct the at least one processor to:
  measure a received signal communication parameter value of a first cell, wherein the first cell is a cell that is capable of providing a communications service to a terminal device;
  when the received signal communication parameter value of the first cell is greater than a first threshold of the first cell, set the first cell as a serving cell of the terminal device;
  measure a received signal communication parameter value of a second cell, wherein the second cell is a neighboring cell of the first cell;
  when the received signal communication parameter value of the first cell, measured after setting the first cell as the serving cell of the terminal device, is less than or equal to the first threshold of the first cell, obtain a second threshold of the second cell, wherein the second threshold of the second cell is greater than or equal to a second minimum threshold of the received signal communication parameter of the second cell; and
  when the received signal communication parameter value of the second cell is greater than the second threshold of the second cell, set the second cell as the serving cell of the terminal device in an enhanced coverage mode.

11. The communications apparatus according to claim 10, wherein the second threshold of the second cell comprises at least a sum of the second minimum threshold of the received signal communication parameter of the second cell and an offset of a first minimum threshold of the received signal communication parameter of the second cell.

12. A method for cell selection, the method comprising:
measuring, by a terminal device, a received signal communication parameter value of a first cell, wherein the first cell is a cell that is capable of providing a communications service to the terminal device;
if the received signal communication parameter value of the first cell is less than or equal to a first threshold of the first cell, obtaining, by the terminal device, a second threshold of the first cell, wherein the first threshold of the first cell is greater than or equal to a first minimum threshold of a received signal communication parameter of the first cell, and wherein the second threshold of the first cell is greater than or equal to a second minimum threshold of the received signal communication parameter of the first cell; and
when the received signal communication parameter value of the first cell is greater than the second threshold of the first cell, setting, by the terminal device, the first cell as a serving cell of the terminal device.

13. The method according to claim 12, wherein setting the first cell as a serving cell of the terminal device comprises setting the first cell as a serving cell of the terminal device in an enhanced coverage mode.

14. The method according to claim 12, wherein the first threshold of the first cell comprises at least a sum of the first minimum threshold of the received signal communication parameter of the first cell and an offset of the first minimum threshold of the received signal communication parameter of the first cell, and wherein the second threshold of a second cell comprises at least a sum of the second minimum threshold of the received signal communication parameter of the first cell and the offset of the first minimum threshold of the received signal communication parameter of the first cell.

15. The method according to claim 12, wherein after setting the first cell as a serving cell of the terminal device, the method further comprises:
  measuring a received signal communication parameter value of a second cell, wherein the second cell is a neighboring cell of the first cell;
  obtaining a first threshold of the second cell, wherein the first threshold of the second cell is greater than or equal to a first minimum threshold of the received signal communication parameter of the second cell; and
  if the received signal communication parameter value of the second cell is greater than the first threshold, setting the second cell as the serving cell of the terminal device.

16. The method according to claim 15, wherein setting the second cell as a serving cell of the terminal device comprises setting the second cell as a serving cell of the terminal device in a non-enhanced coverage mode.

17. The method according to claim 15, wherein the first threshold of the second cell comprises at least a sum of the first minimum threshold of the received signal communication parameter of the second cell and an offset of the first minimum threshold of the received signal communication parameter of the second cell.

18. The method according to claim 15, wherein:
the received signal communication parameter of the second cell is received signal strength of the second cell, and the received signal communication parameter value of the second cell is a received signal strength value of the second cell; or
the received signal communication parameter of the second cell is received signal quality of the second cell, and the received signal communication parameter value of the second cell is a received signal quality value of the second cell.

19. The method according to claim 12, wherein:
the received signal communication parameter of the first cell is received signal strength of the first cell, and the received signal communication parameter value of the first cell is a received signal strength value of the first cell; or
the received signal communication parameter of the first cell is received signal quality of the first cell, and the received signal communication parameter value of the first cell is a received signal quality value of the first cell.

20. The method according to claim 12, wherein the method further comprises:
receiving, by the terminal device, a broadcast message from a base station to which the first cell belongs, wherein the broadcast message comprises the first minimum threshold of a received signal communication parameter of the first cell and the second minimum threshold of the received signal communication parameter of the first cell.

* * * * *